(12) United States Patent
Wood et al.

(10) Patent No.: US 8,400,511 B2
(45) Date of Patent: Mar. 19, 2013

(54) OPTICAL DETECTION AND RANGING SENSOR SYSTEM FOR SENSE AND AVOID, AND RELATED METHODS

(75) Inventors: Rhande P. Wood, Weatherford, TX (US); Michael I. Jones, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 557 days.

(21) Appl. No.: 12/630,925

(22) Filed: Dec. 4, 2009

(65) Prior Publication Data

US 2011/0134249 A1    Jun. 9, 2011

(51) Int. Cl.
*H04N 5/33* (2006.01)
*H04N 7/18* (2006.01)

(52) U.S. Cl. ......................... 348/164; 348/140
(58) Field of Classification Search .................. 348/140, 348/164
See application file for complete search history.

(56) References Cited

U.S. PATENT DOCUMENTS

| | | | |
|---|---|---|---|
| 4,965,442 A | 10/1990 | Girod | |
| 5,003,166 A | 3/1991 | Girod | |
| 5,179,407 A | 1/1993 | Kusaka | |
| 5,231,443 A | 7/1993 | Subbarao | |
| 5,448,241 A | 9/1995 | Zeoli | |
| 5,793,900 A | 8/1998 | Nourbakhsh | |
| 5,912,768 A | 6/1999 | Sissom | |
| 6,229,913 B1 | 5/2001 | Nayar | |
| 6,442,476 B1 | 8/2002 | Poropat | |
| 2006/0178830 A1* | 8/2006 | Sherony | 701/301 |
| 2008/0243383 A1* | 10/2008 | Lin | 701/213 |
| 2010/0316305 A1* | 12/2010 | Hong | 382/255 |

OTHER PUBLICATIONS

V. Aslantas, Depth from Automatic Defocusing, 2007 Optical Society of America.
Chiang M, Local Blur Estimation and Super Resolution, 1997 IEEE CVPR Proceedings.

* cited by examiner

*Primary Examiner* — Richard Torrente
(74) *Attorney, Agent, or Firm* — Bracewell & Giuliani LLP

(57) ABSTRACT

An apparatus carried by an unmanned vehicle to provide passive sensing and facilitate avoiding airborne aerial obstacles is provided. The apparatus can include at least one, but typically multiple optical systems installed, for example, in the nose of the aerial vehicle to passively sense and determine a range, direction, and velocity of the airborne obstacles to allow the aerial vehicle to avoid the airborne obstacles. The typical optical system includes at least one focal plane array or other imaging device configured to receive a wide field of view and at least one focal plane array or other imaging device configured to receive a steerable narrow field of view within the wide field of view to allow concentrated determination of the range, direction, and/or velocity of obstacles detected by the wide field of view imaging devices.

26 Claims, 26 Drawing Sheets

OPTICAL DETECTION AND RANGING SENSOR SYSTEM FOR SENSE AND AVOID, AND RELATED METHODS

BACKGROUND OF THE INVENTION

1. Field of the Invention

The present invention relates generally to range detection and collision avoidance. More specifically, the present invention relates to apparatus, optical systems, program product, and methods for passively sensing and avoiding aerial targets.

2. Description of the Related Art

The American Society for Testing and Materials (ASTM) International established Committee F-38 on unmanned aircraft systems (UASs) or unmanned aerial vehicles (UAVs) to identify design and performance standards for airborne sense-and-avoid systems. The committee has recently issued standards that require a UAS/UAV to be able to detect and avoid another airborne object within a field of regard of ±15 degrees Elevation and ±110 degrees Azimuth and to be able to respond so that collision is avoided by at least 500 ft. The 500 ft safety bubble is derived from the commonly accepted definition of what constitutes a near mid-air collision. The inventors have recognized that the standard will likely be incorporated by reference in eventual Federal Aviation Administration (FAA) certification requirements. The inventors have also recognized that in order to meet such standard in both compliant and noncompliant environments, detection of a target, for example, having an optical cross-section of a Cessna 172 aircraft (approximately 22.5 square meters) at a range of at least approximately 10 kilometers with a probability of detection of 90% or better, for a single "look," at night and in bad weather, would be desirable, if not required.

Typical current attempts at passive ranging with electro-optical (EO) or infrared (IR) sensors onboard a UAS have involved performing maneuvers by the UAS in order to speed convergence of tracking algorithms which are utilizing angle-angle only data. Such maneuvers, however, disrupt the operational mission of the UAS and can unwittingly highlight the location of the UAS in a hostile environment. Also, besides long convergence times, such systems suffer from high false alarm rates. Due to such poor performance, active sensors, such as radar, are being added to help overcome the problems which result in a loss of any existing "low observability" capability while using the sense and avoid system. Recognized by the inventors is that it would be very beneficial if other methods could be used to determine the range of an aerial target/potential obstacle using passive EO and/or IR sensors without requiring the UAS to maneuver to help estimate range to target. There are several ways this might be accomplished in a non-cooperative environment. For example, one method employed by ground vehicles is the use of stereo optics. This method typically suffers from high cost due to double optics, sensor alignment and vibration problems, along with high computational costs, large baseline separation requirements, and dual tracking problems. The large field of regard needed to meet the sense and avoid design space can also present a major problem as multiple sets of data may be required. This could also require multiple stereo optics or a steerable stereo optics sensor system.

Several methods exist which do not require stereo optics. These include single optics systems employing the Depth from Focus (DFF) method, the split-prism focusing method, and the Depth from Defocus (DFD) method. The DFF method is relatively simple in that the range of the object is determined by focusing the object on an image detector in a camera system and, using the camera settings and known lens characteristics, solving an equation to determine the distance from a reference point within the camera. DFF has several disadvantages. For example, multiple images (at least 20 or 30 or more) must generally be taken using at least one different camera parameter, e.g., one for each range, and the camera setting providing the sharpest image must be identified. Accordingly, such methodology can be relatively slow, both in acquiring the imaged data, and in resolving the data. Such method can also require a great deal of system resources. Further, as the distance between the imaged point and the surface of exact focus increase or decreases, the imaged objects become progressively more defocused. Similarly, the split-prism focusing method requires a new operation for every potential target.

The DFD method has advantages over the DFF method (and the split-prism method). For example, depending upon the environmental conditions, DFD may require processing as little as about 2-3 as compared to a large number of images in the DFF method. As such, the inventors have recognized that a complete range map can be made from as little as two or three images using DFD, while even under the most idealistic conditions, the DFF and split-prism methods would require at least one image for every target which would resultantly require mechanically adjusting the focus to optimal for each one in turn. The DFD method, however, does require an accurate camera calibration for the camera characteristics (e.g., point spread function as a function of different camera parameters) which the DFF and split-prism methods do not. Nevertheless, as an aerial environment can produce multiple simultaneous potential obstacles within a field of view, which would precipitate a requirement to know the range of each of the potential obstacles, the inventors have recognized that, due to the requirement for relatively few images (down to as little as a single defocus for a complete range map), the advantages of DFD outweigh the disadvantages.

Testing, via computer modeling, was performed on various types of sensors to include: a long wave wide-angle uncooled IR focal plane array sensor system represented by a 1024×768 Uncooled IR Focal Plane Array sensor including 65 micron pixel pitch detectors and by a 1024×768 Uncooled IR Focal Plane Array sensor including 25 micron pixel pitch detectors with short focal lengths. Each failed to perform to the desired standards even minimally. By extending the focal length of the array having 25 micron pixel pitch detectors (narrowing the field of view), marginal performance was achieved, however, in order to cover a field of regard of 30 degrees vertical by 44 degrees horizontal, it required 10×11=110 snap shots at the narrower field of view, and a way to change where the narrow field of view optics are looking at, would be required. Testing, via computer modeling, was also performed: using a wide-angle small lowlight television (LLTV) or night vision sensor system represented by a monochrome CCD camera having detector resolution of 1400×1024 pixels which performed poorly, and using narrow field of view (150 mm focal length) optics for the LLTV sensor which performed somewhat adequately in good weather and good illumination conditions only. It was determine that a wide angle sensor system using five LWIR sensors to cover the required field of regard with depth of defocus sensing and processing capabilities would potentially be adequate for a high performance aircraft that can pull 5 Gs or more. Recognized by the inventors, however, is that such configuration would, in many instances, be inadequate for a less maneuverable aircraft such as a UAS that can only pull less than 2 Gs. Further, recognized by the inventors is that existing algorithms which have been published fail to provide for determining range at long ranges (e.g. 10 kilometers) due to atmospheric effects, and thus, would not be capable of performing to the prescribed standards unless possibly the air is perfectly still and atmospheric loss of signal is taken into account.

The inventors have further recognized that it would not be necessary to cover the entire field of regard at a narrow field of view if data collected during a wide field of view operations was properly utilized, and that an enhanced optical system would detect most of the small targets using the wide field of view by allowing a high false alarm rate and multiple looks. Accordingly, a common optics system providing the advantages of both a wide angle field of view and narrow angle field of view, would achieve reliable warning in time to avoid non-compliant high speed aircraft on a collision course with the UAS. Once a set of possible targets is collected at wide angle, then a narrow field of view operation can be employed to confirm true targets with good range data and eliminate most of the false alarms during the process. This could potentially take a lot less than 110 snap shots at the narrow field of view for the target confirmations and false alarms elimination steps. Also recognized is that operations between the wide field of view and the narrow wide field of view could be interleaved so that only a fraction of a second occurs between wide field of view snap shots, and track filtering could also be used as well to help eliminate some of the false alarms. The optical system could include a beam splitter or other light divider, but at the cost of some light. Alternatively, a mirror located after the primary lens of the sensor system which deflects the focused rays of light through a different optical path could be employed to allow for interleaved operation with little loss of light. Further, a piezo-electric device or other mechanism could be used to move a detector array or other image sensor back and forth relatively quickly along the optical axis to produced focused and defocused images, or defocused and more defocused images.

Correspondingly, the inventors have recognized the need for apparatus, optical systems, program product, and methods for providing passive sensing and facilitating avoiding airborne obstacles which can provide image acquisition using both narrow field and wide fields at substantially the same time, which can allow the UAS to detect and avoid another airborne object having a 22.5 square meters optical cross-section within a field of regard of ±15 degrees Elevation and ±110 degrees Azimuth at a range of at least approximately 10 kilometers with a probability of detection of 90% or better at night and in bad weather, and which can provide data to cause the UAS to respond so that a collision is avoided by at least 500 ft.

SUMMARY OF THE INVENTION

In view of the foregoing, various embodiments of the present invention advantageously provide apparatus, optical systems, program product, and methods for passively sensing and avoiding aerial targets. Various embodiments of the present invention advantageously provide apparatus, optical systems, program product, and methods for providing passive sensing and facilitating avoiding airborne obstacles can advantageously provide image acquisition using both narrow and wide fields of view at substantially the same time, which can allow an unmanned aerial system (UAS) or vehicle (UAV) to detect and avoid another airborne object having a 22.5 square meters optical cross-section and located within a field of regard of ±15 degrees Elevation and ±110 degrees Azimuth at a range of at least approximately 10 kilometers with a probability of detection of 90% or better at night and in bad weather. Advantageously, various embodiments of the apparatus, optical systems, program product, and methods can allow the UAS to respond so that collision is avoided by at least 500 ft.

More specifically, an example of an embodiment of an apparatus for passively sensing and avoiding aerial targets can include an optical system including an objective lens assembly (e.g., Cooke triplet) and/or field lens, or a curved mirror assembly (e.g., primary curved mirror) positioned to gather incoming light from the aerial environment including one or more airborne objects that are within a substantial portion of a field of regard defining a wide field of view (WFOV), a collimator in the form of, e.g., a mirrored pair of achromatic doublets or one or more collimating mirrors, positioned to receive and collimate light waves providing an optical image within the wide field of view and to align the light waves having differing wavelengths entering the collimator to reduce dispersion of separate color components thereof, and can include an image detector, such as, for example, a narrow field of view (NFOV) focal plane array (FPA) containing a plurality of light-sensing detectors or other light sensing elements positioned to receive at least a portion of the optical image within the wide field of view to generate image data. The optical system can also include a scan mirror assembly positioned in optical communication with the collimator and in optical communication with the focal plane array to selectively direct light reflected from the one or more airborne objects to the focal plane array according to the narrow field of view, an infrared (IR) spatial light modulator (SLM) positioned in optical communication with the scan mirror assembly and the focal plane array and positioned to adjust the light intensity of light directed to the focal plane array responsive to environmental lighting conditions of the light received from the scan mirror assembly to thereby maintain the light intensity of the light directed to the focal plane array below a maximum intensity level, and can include an achromatic doublet positioned between the spatial light modulator in the focal plane array to correct any residual transverse chromatic aberrations.

The optical system can also include a second focal plane array positioned to generate image data according to the wide field of view, and a beam splitter, flip mirror, half silvered mirror, or other similar light divider or other form of channeler positioned to simultaneously or alternatingly provide the optical image of the aerial environment according to the wide field of view to the scan mirror assembly and to the second focal plane array. The optical system can also include a second spatial light modulator positioned in optical communication with the light channeler and the second focal plane array to adjust the relative aperture size of light directed to the second focal plane array to rapidly optimize blur differential between images and/or objects within an image to enhance determining atmospheric blur and range estimates, and to adjust the light intensity of light directed to the second focal plane array responsive to environmental lighting conditions of the light received from the light channeler to thereby maintain the light intensity of the light directed to the second focal plane array below a maximum intensity level. The apparatus can also include a sensor control and image processor configured to provide control signals to the various controllable components of the optical system and to receive image data from the focal plane arrays.

Various other embodiments of the optical system include dual narrow field of view portions, dual wide field of view portions, electro-optical devices in place of infrared focal plane arrays, and/or digital light processors in place of infrared spatial light modulators, etc.

Various embodiments of the present invention also include methods of passively sensing and avoiding aerial targets. Such a method, for example, can include the steps of collecting image data for each of at least one, but typically a plurality of pairs of images of an aerial environment within a field of regard including one or more airborne objects using at least one different optical system parameter setting for each image in each image pair, comparing the image data of one of the pair of images to the image data of the other of the pair of images to determine an approximate amount of atmospheric blur in the image data, determining an amount of atmospheric blur in the images responsive to the comparison, removing the atmospheric blur from image data for at least one of the pair of images to form conditioned image data, and determining an approximate range to each of the one or more airborne objects within the field of view of an optical system responsive to the conditioned image data. The method can also include the steps of forming a range map of the range of each separate one of the plurality of airborne objects using conditioned image data derived from two or three pairs of images of the environment within the field of view of the optical system, and prioritizing the plurality of airborne objects within the wide field of view responsive to the respective determined approximate range.

The method can also, or alternatively, include determining an approximate range of each of the plurality of airborne objects within the wide field of view of the optical system, determining one of the plurality of airborne objects located within the wide field of view of the first portion of the optical system to have a highest priority, positioning components of the second portion of the optical system so that the highest priority airborne object is within the narrow field of view of the second portion of the optical system, determining a first, a second, and a third approximate range to the highest priority airborne object, determining the approximate direction and velocity of the high-priority airborne object responsive to the determined first and second approximate ranges, and projecting an anticipated location of the highest priority airborne object during a next range determination responsive to the determined third approximate range. The method can also include panning first and second scan mirrors to substantially position a center of the narrow field of view at approximately the anticipated location of the highest priority airborne object during the next range determination responsive to the projecting to enhance determining range, direction, and velocity of the highest priority airborne object, and determining an enhanced value for the range, direction, and velocity of the high-priority airborne object responsive to the panning.

The method can also or alternatively include determining an approximate location, direction, and velocity of at least a highest-priority one of the plurality of airborne objects, determining a trajectory to avoid each of the plurality of airborne objects by at least 500 feet, and performing an evasive maneuver responsive to the determined trajectory to avoid each of the plurality of airborne objects by at least 500 feet.

Various embodiments of the present invention are capable of handling up to and including a dual sensor band, dual detector layout for sensor fusion computations with both wide and narrow fields of view in a single optics system with multiple scanning mirrors, beam splitters, and spatial light modulators for visible and IR bands.

Various embodiments of the present invention include a beam splitter to allow the apparatus to simultaneously analyze both wide and narrow fields at the cost of some light. Alternative embodiments of the present invention utilize a mirror which deflects the focused rays of light through a different optical path after the primary lens of the sensor system to provide interleaved operation with little loss of light. Various embodiments of the present invention utilize a piezo-electric device or other mechanism to move an optical detector array along the optical axis to produced focused and defocused images, quickly and accurately and in such a manner that the distance is know or is easily determined.

Various embodiments of the present invention advantageously combine use of lowlight electro-optical (TV) camera/shortwave IR sensors and mid-band IR sensors/long wave IR sensors to provide daytime, nighttime, bad weather capabilities. Various features can include dual baud detectors, spatial light modulators to provide adaptive aperture and light control, spatial light modulators to reduce the effective image overlap, multiple sensors using multiple fields of view—wide field of view processing followed by narrow field of view operation, with common optics using two scanning mirrors, a field of regard of 30 degrees vertically and 44 degrees horizontally for each of, e.g., five sensors to create a ±15 degrees elevation and ±110 degrees azimuth, and track filtering to eliminate false alarms. According to various embodiments of the present invention, the optical system employs a wide field of view portion having a high false alarm rate followed by narrow field of view with multiple looks to confirm true targets with good range data and to eliminate false alarms.

Various embodiments of the present invention provide enhanced range accuracy, passive image acquisition, subpixel object detection, multiple fields of view, a wide field of regard coverage, simultaneous multiple fields of view with narrow field of view operation over the entire wide field of view without use of gimbals or motion of vehicle, and/or a sensor control and image processor which employs an algorithm capable of range measurements with a single sensor and fixed focus setting which can detect objects smaller than a pixel without need for two cameras.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well. It is also to be noted that the drawings of the various optical systems described below are in the form of simplified functional diagrams generally illustrating only major components thereof or components necessary to enhance the description of the respective optical system, and are not intended to be independently complete optical designs. That is, as would be understood by one of ordinary skill in the art, the proportions and scales may have been adjusted to emphasize one item over another. Also, to enhance simplicity, a number of items such as mountings or stops may have been removed and a number of characteristics such as the to-scale spacing between components, glass types, glass thickness, etc., may have been adjusted. Further, it should be understood to one of ordinary skill in the art that the complete optical design may require additional lenses to meet some of the system requirements for optical performance such as: vignetting, spectral range, modulation transfer function (MTF), root mean square wavefront degradation, encircled energy, and distortion, etc. One of ordinary skill and knowledge in the art, nevertheless, would be able to build the independently complete designs of the featured optical systems utilizing, for example, the drawings, the associated detailed description, and the knowledge of one of ordinary skill in the art. The description of the drawings follows.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
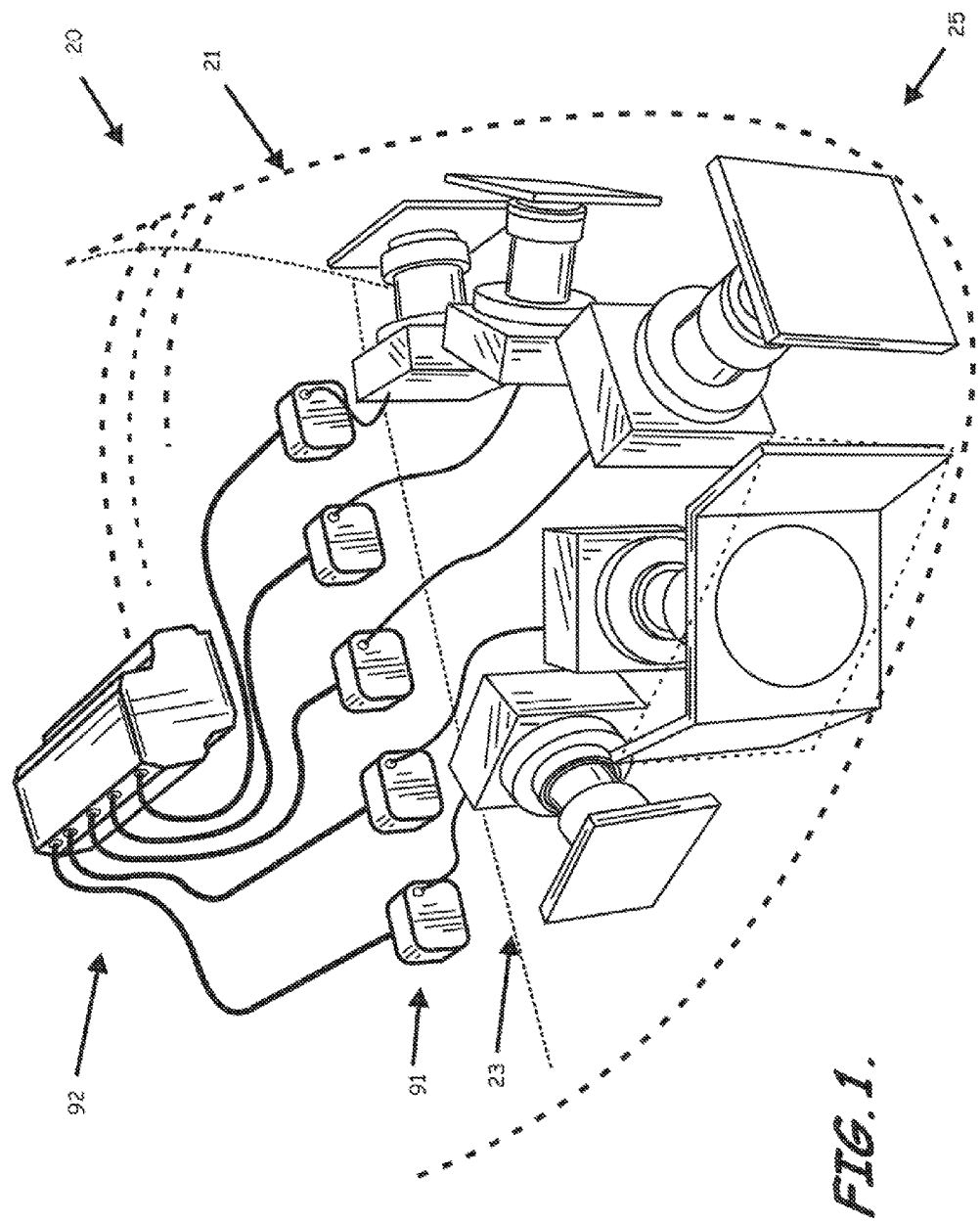
FIG. 1 is an environmental view of an apparatus for passively sensing and avoiding aerial targets according to an embodiment of the present invention.
Figure 2:
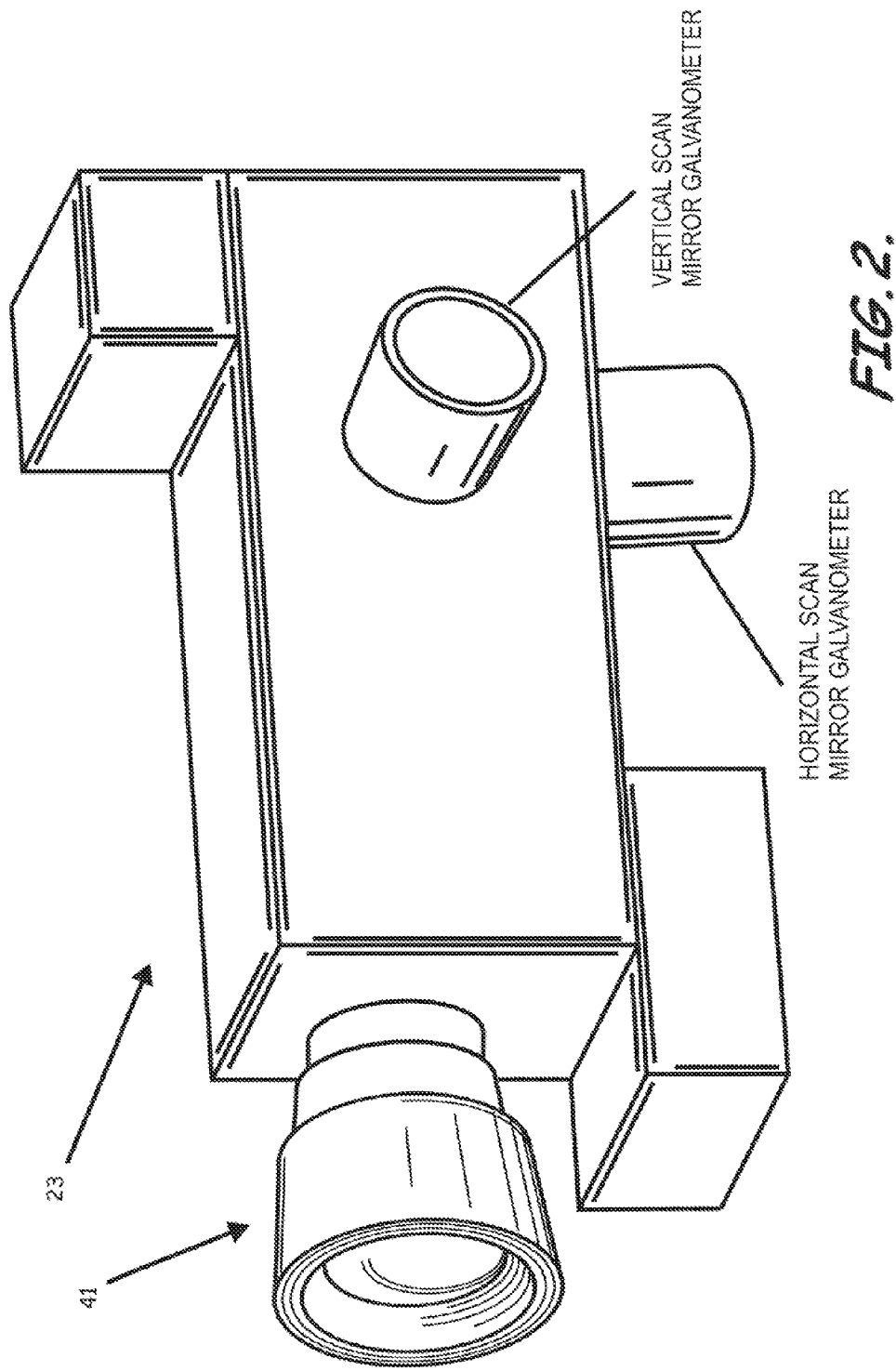
FIG. 2 is a perspective view of an optical system for passively sensing and avoiding aerial targets according to an embodiment of the present invention.
Figure 3:
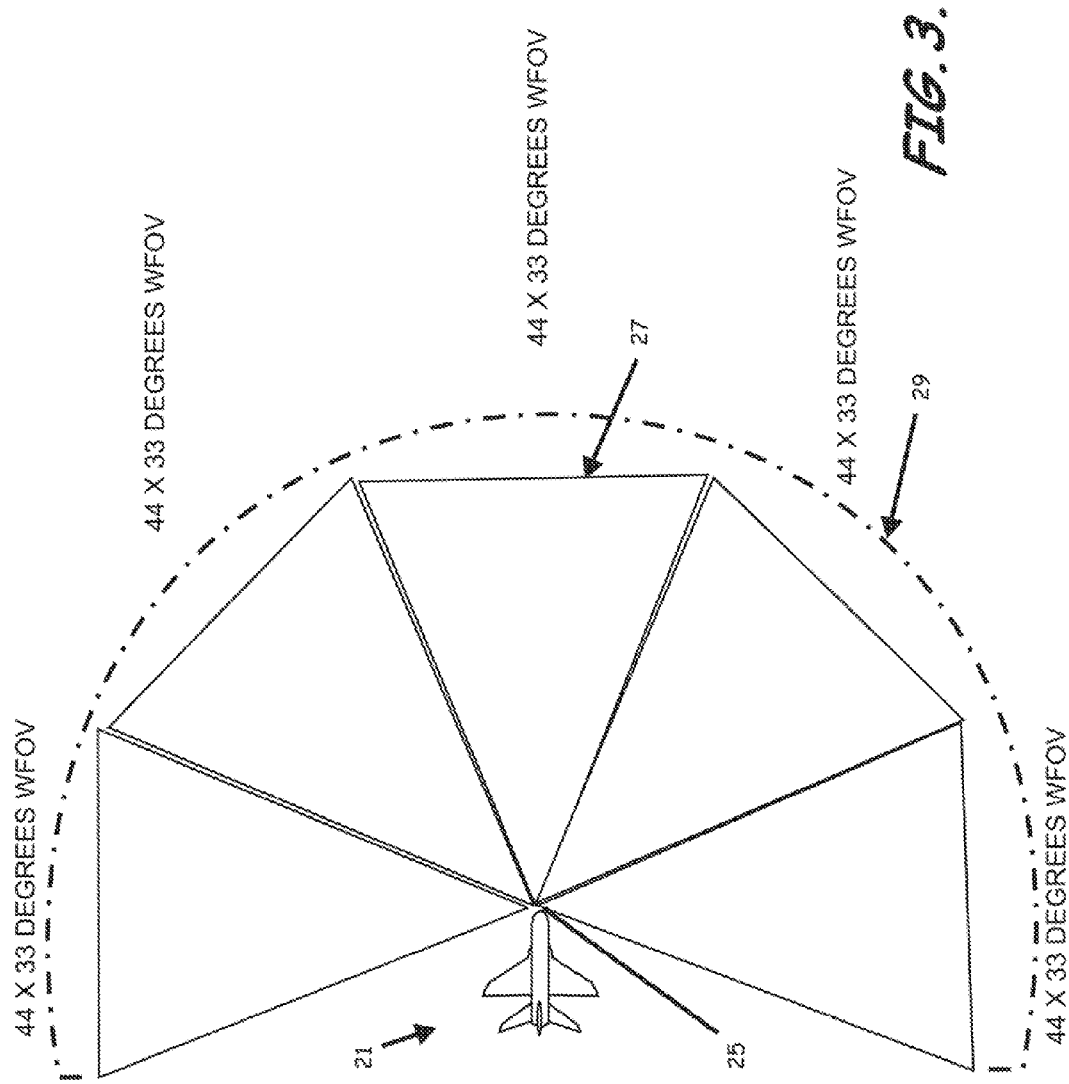
FIG. 3 is a diagram of a field of regard subdivided into five wide fields of view for the apparatus of FIG. 1 according to an embodiment of the present invention.

As perhaps best shown in FIG. 1, an apparatus 20 carried by an unmanned vehicle as known to those skilled in the art, such as, for example, aerial vehicle 21, to provide passive sensing and facilitate avoiding, e.g., airborne obstacles, also as known to those skilled in the art, is provided. The apparatus 20 can include at least one, but typically five, optical systems 23 installed, for example, in the nose 25 of the aerial vehicle 21 (see also FIG. 2). According to a preferred configuration, each of the optical systems 23 cover a wide field of view 27 of about 44 degrees azimuth and 33 degrees elevation described in more detail below. As perhaps best shown in FIG. 3, such configuration provides a total coverage of about ±16.5 degrees in elevation and ±110 degrees azimuth off the nose 25 of the aerial vehicle 21. Note, as will be described later, alternative implementations can employ a scanning mirror assembly at the front of the optical system 23 to cover the entire wide field of regard 29 of ±15 degrees in elevation and ±110 degrees azimuth with a single system.

Figure 4:
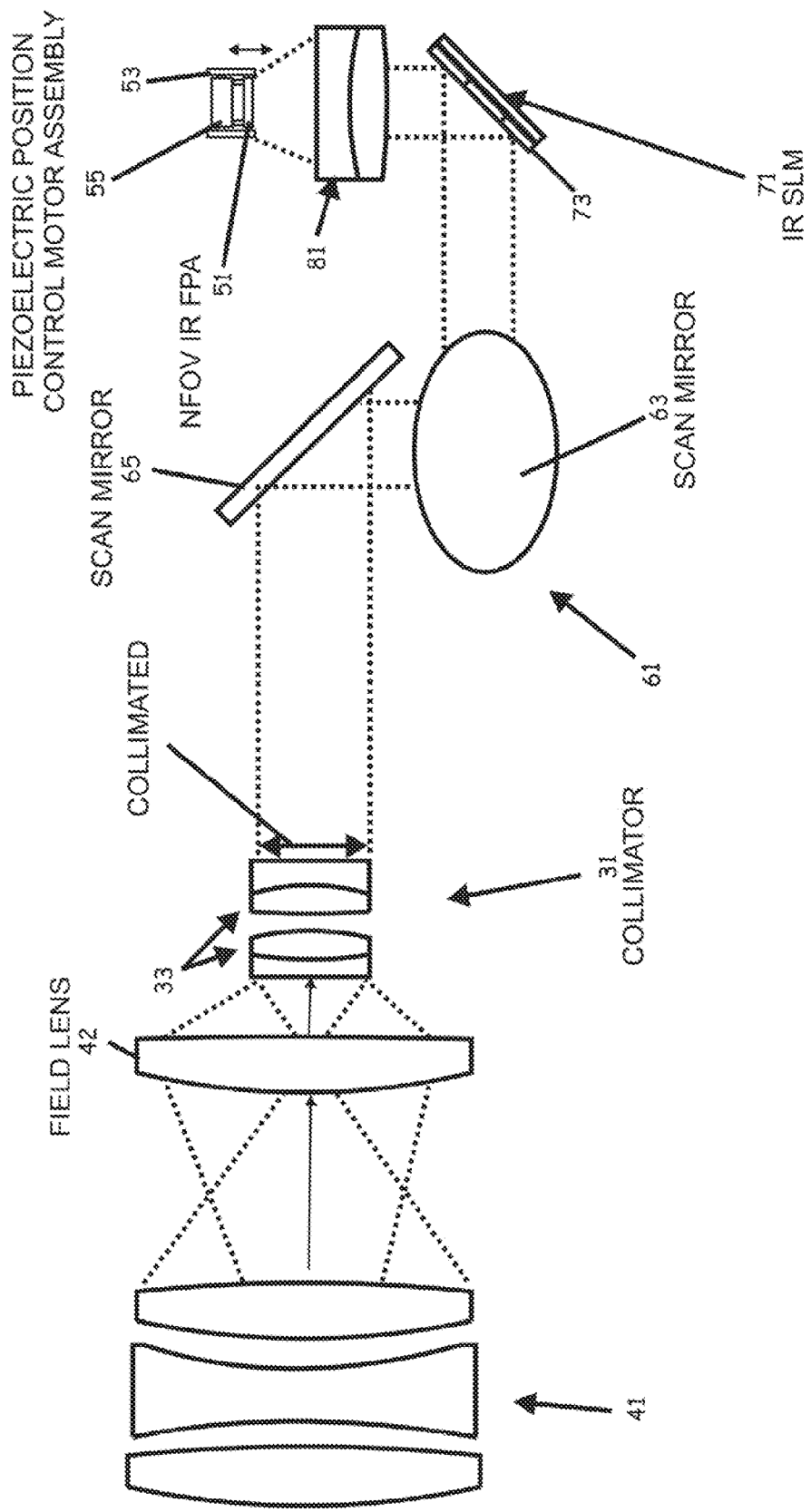
FIG. 4 is a schematic diagram of an optical system for passively sensing and avoiding aerial targets having an optical detection and ranging infrared sensor with steerable narrow field of view according to an embodiment of the present invention.

FIG. 4 illustrates an example of an embodiment of the optical system 23. In this embodiment, the optical system 23 includes an objective lens assembly 41, e.g., a Cooke triplet, and/or a field lens 42. The field lens 42, when employed, can be is positioned, for example, at or near the focal plane of the objective lens assembly 41 to reduce the diameters required for the downstream optics of the optical system 23 for the wide field of view 23. The field lens 42 helps prevent off-axis image forming light from being clipped or vignetted by the downstream optics. Such function of the field lens 42 can be performed by reimaging the received light at the objective lens assembly aperture stop (e.g., outer rim) into the downstream optics, while having no effect on the power of the objective if placed, for example, precisely at the focus of the objective. The optical gain factor introduced by the field lens 42 is approximately the ratio between the area of the field lens 42 and the area of the image formed of the objective lens assembly aperture stop. Note, it should be understood that for a high optical gain factor, the field lens 42 will typically include several elements to correct for aberrations. To help simplify the drawings, however, the field lens 42 is illustrated as a single element. As with many of the other illustrated optics, it will be understood by one of ordinary skill in the art that other configurations of the field lens 42 are within the scope of the present invention.

Note also, as to be described later, according to an alternative embodiment of the optical system 23, rather than employ lenses, such as, for example, objective lens assembly 41 and field lens 42, at the front of the optical system 23 for gathering and focusing light on a collimator 31 (described below), the optical system 23 can additionally or alternatively include a curved mirror assembly (see, e.g., FIG. 13) positioned to gather the incoming light from the aerial environment that is within the wide field of view (e.g., about 44 degrees azimuth and 33 degrees elevation) including the one or more airborne objects.

The optical system 23 can also include a collimator 31 positioned to receive and collimate light waves within the wide field of view 27 and to align the light waves having differing wavelengths entering the collimator to reduce dispersion of separate color components. The collimator 31 is used to prevent the dispersion in a separate color components (having different wavelengths) which occurs because the angle of refraction is dependent on the refractive index, which in turn is dependent on the wavelength. In the configuration shown in FIG. 4, the collimator 31 includes a pair of matched achromatic doublets 33.

The optical system 23 also includes an image detector, such as, for example, an infrared (IR) narrow field of view (NFOV) focal plane array 51 including a plurality of light-sensing detectors or other light sensing elements, positioned to receive at least a portion of the optical image within the wide field of view to generate image data. That is, as will be described in more detail below, the focal plane array 51 shown in FIG. 4 receives collimated light according to a narrow field of view. In the illustrated embodiment, the light received is in the infrared spectrum. A galvanometer or other similar device (not shown) can be used detect the electrical current differential caused by the different amounts of light delivered to each element of the focal plane array 51. The focal plane array 51 is normally housed within enclosure 53. A piezoelectric stepper control motor assembly 55 or other functionally similar device is connected to the focal plane array enclosure 53 to allow for controlled movement along the optical axis of the focal plane array 51 to vary the optical parameters thereof. The piezoelectric stepper control motor assembly 55 includes a piezoelectric stepper control motor (not shown) attached to micrometer screws similar to a vernier micrometer. The micrometer screws move the focal plane array 51 along with its enclosure shell back and forth along a short track to change the relative position of the focal plane array detector 51.

The optical system 23 can also include a scan mirror assembly 61 positioned in optical communication with the collimator 31 and in optical communication with the focal plane array 51 to selectively direct light reflected from the one or more airborne objects to the focal plane array 51 according to a narrow field of view, which typically consists of an image area of less than approximately 10 percent of an image area of the wide field of view. The scan mirror assembly 61 includes a first and a second scan mirror 63, 65, which, in combination, provide airborne object or objects selection according to a selected/desired/determined narrow field of view from within the wide field of view. The scan mirrors 63, 65, are moved, for example, by galvanometer mechanisms (see, e.g., FIG. 2). The field of scan of the scan mirror assembly is determined by an angle equal to twice the mirror deflection angle. Accordingly, the typical scanned field can be ±20° in both directions perpendicular to the optical axis with ±25° being the usual maximum scanned field. This capability allows the scanning angle to fall within the wide field of view of the desired field of regard of, for example, 30 degrees vertical by 44 degrees horizontal if one mirror scans about ±15° and the other mirror is set up to scan about ±22° to thereby provide the narrow field of view scanning capability for the focal plane array 51 or other optical sensing device. Note, the ±15°/±22° degree combination is for exemplary purposes only. It should be understood that other combinations to provide the desired azimuth and elevation are within the scope of the present invention.

The optical system 23 can also include an, e.g., infrared (IR), spatial light modulator (SLM) 71 for adaptive aperture and light control that is positioned in optical communication with the scan mirror assembly 61 and the focal plane array 51 to adjust light intensity of light directed to the focal plane array 51 responsive to environmental lighting conditions of the light received from the scan mirror assembly 61 to thereby maintain the light intensity of the light directed to the focal plane array 51 below a maximum intensity level, and can include an achromatic doublet 81 positioned between the spatial light modulator 71 and the focal plane array 51 to correct any residual transverse chromatic aberrations.

Figure 5:
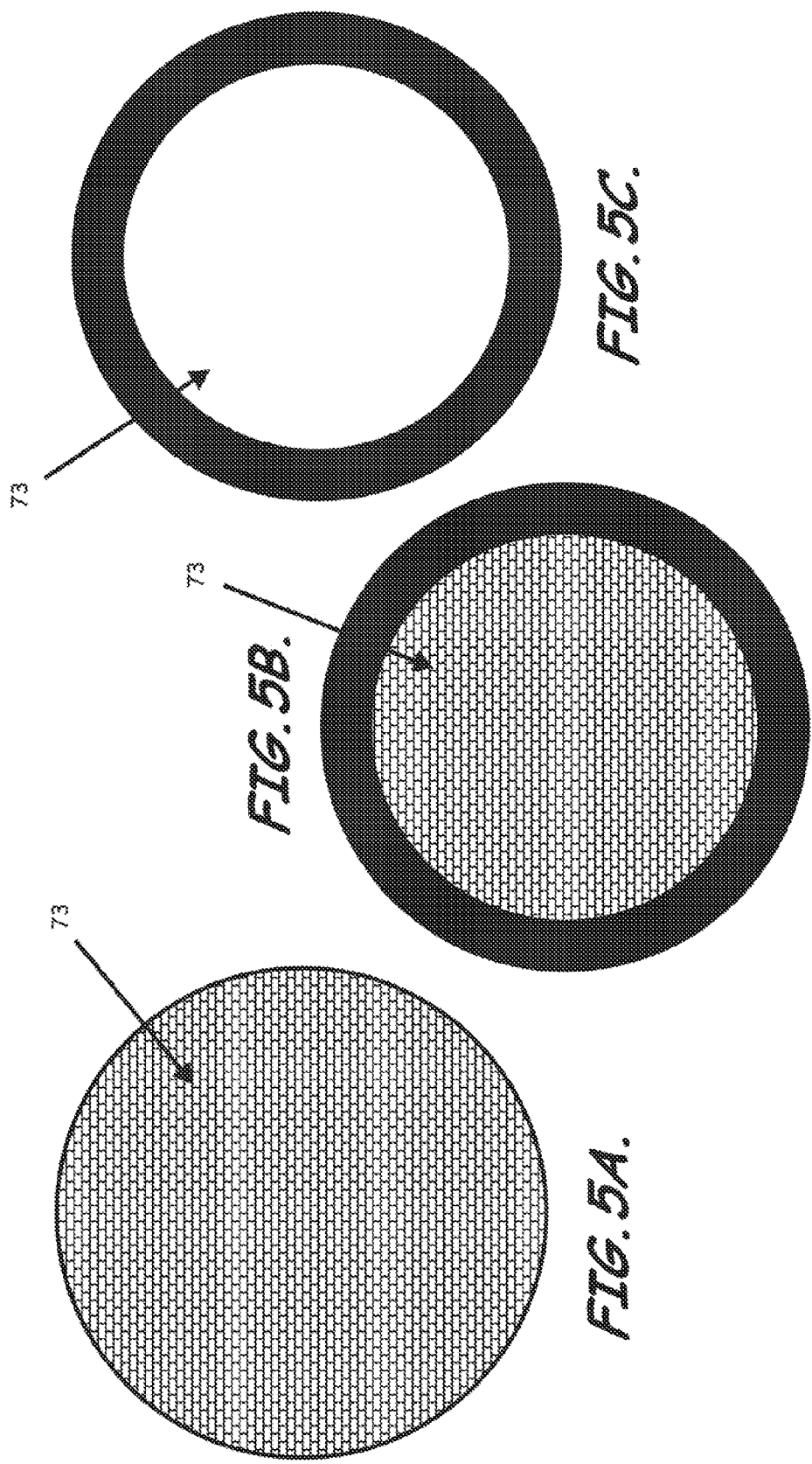
FIG. 5A-5C is a schematic diagram illustrating adaptive aperture and light control according to an embodiment of the present invention.

According to the exemplary configuration, the spatial light modulator 71 includes a plurality of micro-mirrors 73 which, as shown, for example, in FIGS. 5A and 5B, can be used to adjust the amount of light being reflected to the focal plane array 51 by having the mirrors aligned or not align (on/off), and/or can be used to adjust the size of the effective aperture as shown, for example, in FIG. 5C, to thereby enhance passive ranging through the rapid optimization of blur differential between images and/or airborne objects within an image on the focal plane array and the reduction of noise, preferably on the order of between approximately 75 µs and 10 ms, and more preferably on the order of between approximately 75 µs and 1 ms. Note, beneficially such rapid optimization of blur differential through the adjustment of light intensity (e.g., through the variation of light distribution) and/or aperture size can beneficially enhance determining atmospheric blur and object range estimates. A small amount of blur between pairs of images (image pairs) used to calculate atmospheric blur can result in a large probability distribution of range estimates. Likewise, a large amount of blur for any one airborne object within an image can result in a low signal-to-noise ratio resulting in an inaccurate range estimate for the object.

In this illustrated example, the spatial light modulator 71 selectively reflects light in the infrared spectrum. As will be described later, various implementations using similar device concepts can be used to control light in the visible spectrum. Stray radiation suppression in optical systems are considered or otherwise accounted for through, for example, the proper design of baffles, coatings, etc., as understood by those of ordinary skill and the art, particularly in the case of systems which use micro-mirrors. Note, in order to reduce the complexity of the figures, the stray light baffles and/or coatings, etc., are not shown.

Figure 6:
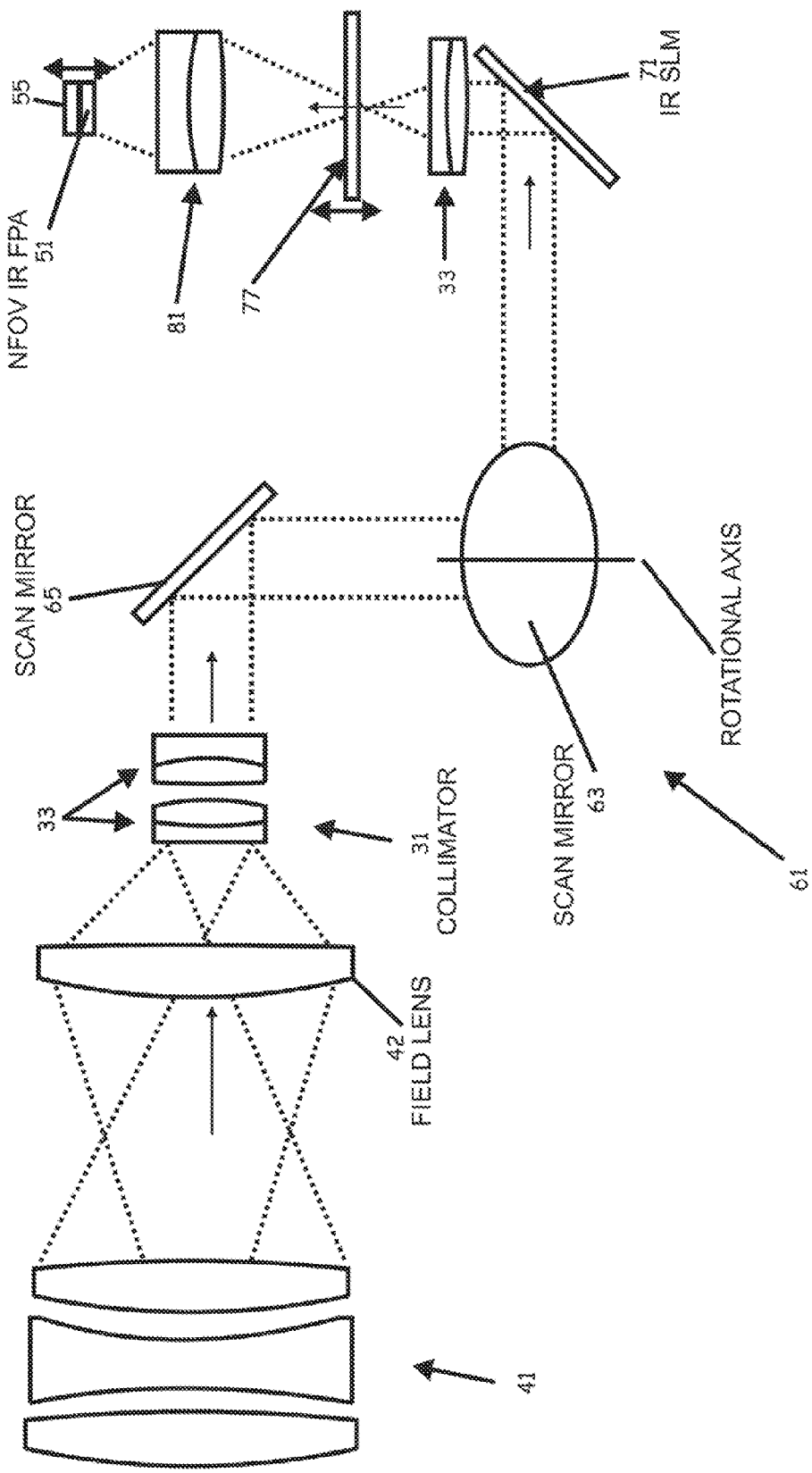
FIG. 6 is a schematic diagram of an optical system for passively sensing and avoiding aerial targets having an optical detection and ranging infrared sensor with steerable narrow field of view and adaptive background control according to an embodiment of the present invention.

FIG. 6 illustrates a second narrow field of view spatial light modulator (e.g., infrared blocking spatial light modulator 77) positioned in optical communication with the first spatial light modulator 71 and the focal plane array 51 to provide adaptive background control with position control. The spatial light modulator 77 is configured to selectively block light surrounding a target image to thereby substantially eliminate background light transmission to the focal plane array 51 to reduce effective image overlap. Particularly, as illustrated, spatial light modulator 77 can be mechanically positioned/repositioned along the optical axis based on a prior estimate of the location of an object of interest, and estimate provided by a tracking solution (described later), or based, at least initially, on a default setting (e.g., initially a midrange focus with the aperture wide open). Beneficially, use of a spatial light modulator 77 so configured can provide background control even when an airborne object of interest is off center from the narrow field of view and when there are multiple objects within the narrow field of view. Note, in this illustrated example, the spatial light modulator 77 selectively blocks light in the infrared spectrum. Various implementations using similar device concepts, however, can be used to control light in the visible spectrum Various embodiments of the present invention employ the spatial light modulator(s) 71, 77 to mask out unwanted light from pixels near the target that would add as noise to the target pixel blur during capture of defocused images. An example of a suitable spatial light modulator is the New LCoS 512×512 Spatial Light Modulator (SLM) for Infrared Wavelengths being marketed by Dynetics which provides for application in the MWIR, LWIR and SWIR spectrums. By way of example, a similar device usable in the visual light spectrum is the Texas Instruments 0.7 XGA Low Voltage Differential Signal (LVDS) DMD which use MEMS technology to produce and control an array of bistable micromirrors. The Texas Instruments 0.7 XGA LVDS includes a 1024×768 array of micromechanical mirrors on a 13.68 micrometer pitch. Each mirror can be individually deflected at ±12° about a hinged diagonal axis. Deflection polarity (positive or negative) of mirrors is individually controlled by changing the binary state of the underlying CMOS control circuitry and mirror reset signal. The 1024×768 mirrors are driven in a block reset fashion allowing for either global or phased reset. Note, although there are various methodologies of reducing noise, such as, for example, increasing the number of bits used to represent the brightness values of individual pixels at the detection stage, controlling sensor dynamic range by careful sensor selection, adjusting integration times, combining multiple frames, and several other approaches as well, the use of spatial light modulators provides advantages not present in the other methodologies.

The spatial light modulators 71, 77, can be further implemented to perform various alternative functions. For example, the spatial light modulator 71 and/or modulator 77 in its/their illustrated configuration can be used to change optics system parameters which affect image blur (described later) to allow for range measurements without moving the focal plane array 51. In another implementation, a separate spatial light modulator (not shown) positioned at a location upstream of the collimator 31 can be used to reduce the effective image overlap. Note, to reduce effective image overlap, an image generally needs to be formed right at the surface of the spatial light modulator. An image that is nearly perfectly focused image on the spatial light modulator has very little image overlap which arises in blurred images. The "pixels" of the spatial light modulator can be switched on around the targets of interest with most of the background pixels being switched off. This passes the light from the targets on to the focal plane array 51, but eliminates most of the background light. Because most of the background light has been eliminated, there is almost no overlapping of background light with the targets when collecting a defocused image on the detector array. One limitation, however, is that the optical system 23 must first identify the potential airborne targets. As will be described in more detail below, this can be accomplished, for example: by using data from the wide field of view image to queue the narrow field of view, by taking multiple wide field of view images, and/or by taking multiple narrow field of view images. Tracking data from an onboard tracking system (described later) can be used to predict new target positions to aid in acquiring additional images to be collected prior to use of the spatial light modulator to reduce the effective image overlap. Note, the spatial light modulators 71, 77, are positioned to receive collimated light to provide aperture control and image overlap reduction and cannot simultaneously be properly employed to reduce effective image overlap because, when implemented to reduce effective image overlap, the respective spatial light modulator requires a focused image.

Figure 7:
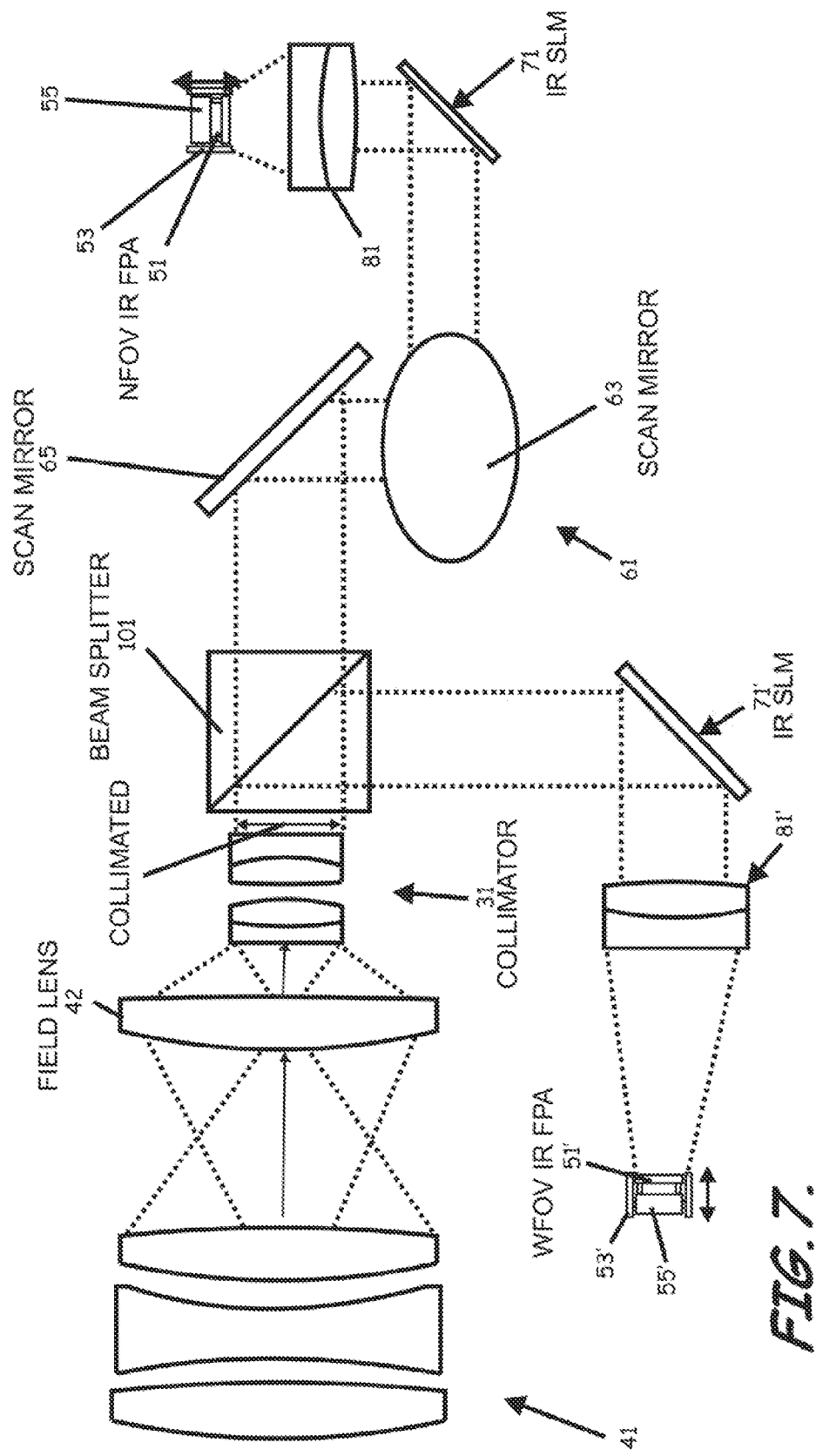
FIG. 7 is a schematic diagram of an optical system for passively sensing and avoiding aerial targets having a common aperture dual field of view optical detection and ranging infrared sensor with steerable narrow field of view according to an embodiment of the present invention.

FIG. 7 illustrates an example of an embodiment of the optical system 23 which includes an additional (second) focal plane array 51' and spatial light modulator 71' in communication with a beam splitter 101, which is positioned to simultaneously provide the optical image of the aerial environment, for example, according to the wide field of view to both the scan mirror assembly 61 for narrow field of view selection/panning to allow selective target process, and to the second focal plane array 51' to allow multi-target processing of targets within the wide field of view. Similar to the function of piezoelectric stepper control motor assembly 55, a piezoelectric stepper control motor assembly 55' or other functionally similar device is connected to a focal plane array enclosure 53' to allow for controlled movement along the optical axis of the focal plane array 51' to vary the optical parameters thereof.

Figure 8:
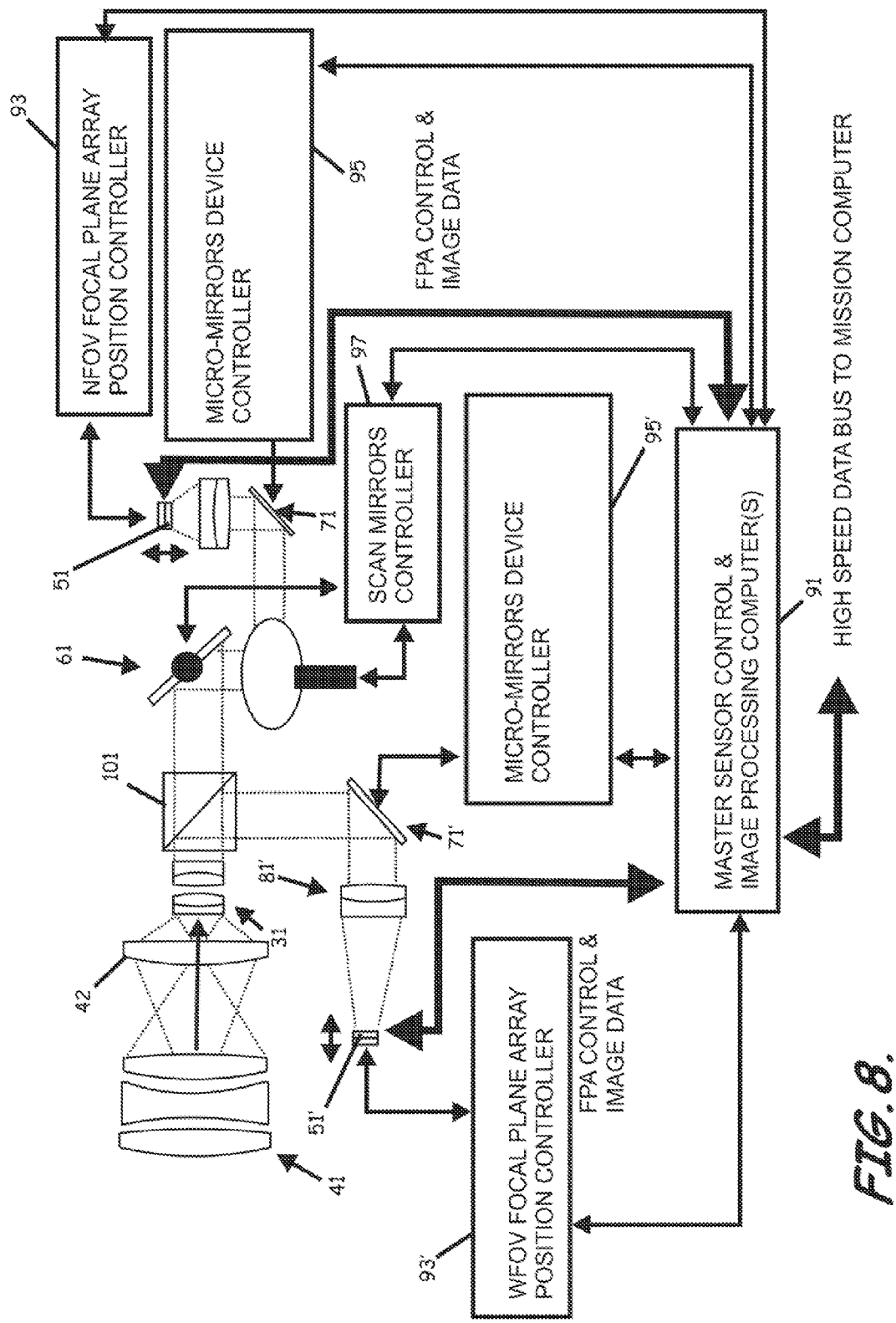
FIG. 8 is a schematic diagram of a control system for the optical system shown in FIG. 7 according to an embodiment of the present invention.

FIG. 8 illustrates the control system of the example of an embodiment of the optical system 23 shown in FIG. 7. The control system can include a sensor control and image processor 91 (e.g., master sensor control and image processing computer or computers) containing memory and firmware/ program product stored in the memory that when executed by one or more processors contained by the sensor control and image processor 91, causes the sensor control and image processor 91: to provide control signals to the scan mirror assembly 61 to thereby direct the first and the second scan mirrors 63, 65, to pan in combination to provide a selected portion of the image area of the wide field of view according to a selected/desired/determined narrow field of view to the focal plane array 51; to provide control signals to the focal plane array 51 to provide image data generation for a plurality of pairs of images at different sensor plane distances according to the narrow field of view; and to receive the image data generated from the focal plane array 51 to separately determine a range value to each of the one or more airborne objects, along with other various operations related to control of the various components of the optical system 23 as will be understood by those of ordinary skill in the art. Correspondingly, according to the exemplary configuration, the optical system 23 also includes both a narrow field of view (NFOV) focal plane array (FPA) position controller 93, a wide field of view (WFOV) focal plane array (FPA) position controller 93', a NFOV micro-mirrors device (e.g., spatial light modulator) controller 95, a WFOV micro-mirrors device (e.g., spatial light modulator) controller 95', and a scan mirror controllers 97, positioned either separately from, or integrally configured within, the sensor control and image processor 91.

In the separate configuration, the focal plane array position controller 93 is operably coupled in communication with the sensor control and image processor 91 and in communication with the piezoelectric stepper control motor assembly 55 to selectively position each separate image within each pair of images at a different offset position to provide a different blurred circle radius between images within each image pair to enhance determining the atmospheric blur (described in more detail below). The spatial light modulator controller 93 is operably coupled in communication with the sensor control and image processor 91 and in communication with each separate one of the micro-mirrors 73 to individually control each of the micro-mirrors 73 to adjust the relative aperture size of light received from the scan mirror assembly 61 to thereby rapidly optimize blur differential between images and/or airborne objects within an image to enhance determining atmospheric blur and range estimates, and to adjust the light intensity of light directed to the focal plane array 51. The scan mirror controller 95 is operably coupled in communication with the sensor control and image processor 91 and in communication with first and the second scan mirror motivators (not shown) to control panning of the first and the second scan mirrors 63, 65, to thereby provide for the airborne object selection according to a selected/desired/determined narrow field of view from within the wide field of view.

In this configuration, the sensor control and image processor 91 can control both image acquisition and narrow field of view (aerial target) selection from within the wide field of view. As will be further described below, the narrow field of view has a much higher probability of target recognition and identification than the wide field of view. Accordingly, the processor 91 can utilize the narrow field of view to obtain a much better range estimate of an airborne target than the wide field of view, and as will be described in more detail below, the wide field of view can be used in its entirety to queue the narrow field of view capability as to where it should be directed to acquire the target or targets.

Note, the processor 91 can include a plurality of individual processors, combined processors, and/or be configured in the form of separate functionally integrated computers, etc., as known and understood by those skilled in the art. Further, processor 91 can be configured to control the various other movable optical components of the various optical system embodiments as described later.

Figure 9:
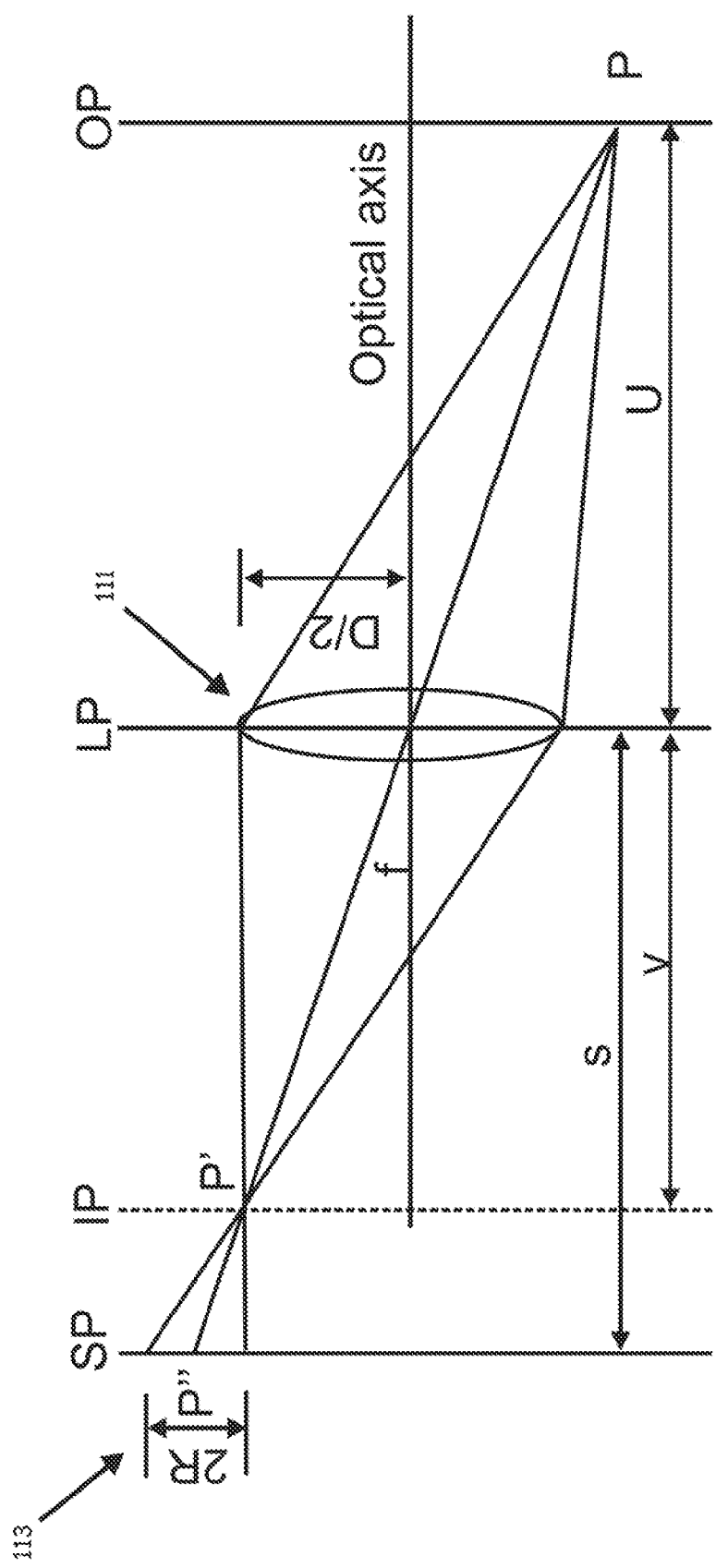
FIG. 9 illustrates a diagram of a simple optical system having variable system parameters.

In order to more fully understand how image acquisition can be obtained, the following describes some general principles of operation of the Depth from Defocus (DFD) method, followed by identification of the specific implementation according to one or more of the various embodiments of the present invention. For exemplary purposes, FIG. 9 illustrates a diagram of a simple optical system having variable system parameters (u, s, f) using a thin lens 111. As shown at 113, a point source of light does not generally form a perfect point on an image detector sensor plane (SP) after the light passes through the imaging optics. Due to the point spread function (PSF) of the optics as understood by those of ordinary skill in the art, a point source (P) of light typically forms a blurred circle of light somewhat similar to two-dimensional Gaussian function. The approximate radius of that circle shown at 113 measured at the standard deviation of the Gaussian distribution is called the blur circle radius (R). According to geometric optics, the normalized radius (R) of the blur circle is given by the equation: R=(D/2)(1/f−1/u−1/s). In the DFD method, the blur circle radius (R) is used to determine the lens plane (LP) to object plane (OP) distance (u) to the objective point (P). One such method proposed by Alex P. Pentland (SRI) that makes use of a Fourier approach requires two pictures taken with two different camera settings of the lens plane (LP) to sensor plane (SP) distance (s), and the point spread function (PSF) of the lens 111. A preferred configuration uses the equation for the normalized radius of the blur circle to help evaluate various sensor configurations for the purpose of passive ranging.

According to one or more embodiments of the present invention, a modified version of Pentland's algorithm for the spatial domain is employed to help evaluate various sensor configurations for the purpose of passive ranging. Beneficially, such methodology can allow for the use of only a single image after sensor calibration, simple equations resulting in evaluation tests that are lower cost and easy to understand, and easy identification of ambiguities that can occur for single image tests. Other methodologies that can be employed include performing: a comparison across differing apertures using two images, a comparison across changes in focal length using two images, a comparison across combinations of parameter changes using two or three images, a comparison using changes in target brightness, and a comparison across multiple images which provide improved results over that of the single image approach.

As noted above, an assumption of Pentland algorithm is that the point spread function due to defocus and the point spread function due to the nominal lens system optics are both two dimensional Gaussian functions. The distance u to the imaged point (P) is related to the parameters of the lens system and the amount of defocus by the following functional equations:

$$u1(f, s, D, k, Socb) := f \cdot \frac{s}{s - f - 2 \cdot k \cdot Socb \cdot \left(\frac{f}{D}\right)} \text{ If } u > u0.$$

$$u2(f, s, D, k, Socb) := f \cdot \frac{s}{s - f + 2 \cdot k \cdot Socb \cdot \left(\frac{f}{D}\right)} \text{ If } u < u0.$$

The range function u1 is defined above where f is the focal length of the lens system, s is the distance between the lens and the image plane, D is the lens diameter, Socb is the spatial constant of the optics corrected blur or point spread function, and k is the proportionality between the blur circle radius and Socb. The range function u1 may be used to estimate the distance u to an imaged point beyond the position of perfect focus u0. The range function u2 is defined above with the same input variable names. This may be used to estimate the distance u to an imaged point that is between the lens and the position of perfect focus u0. Note, all length units are assumed to be in meters in the above equations. Note also, these equations are considered exact only for an aberration-free lens and for points near the optical axis. Compensation can be achieved by spatially varying k.

The spatial constant of the optics corrected blur or point spread function may be computed using the following function:

$$S3(Si, So) := \sqrt{Si^2 - So^2}$$

Function S3 computes the value Socb whereby Si is the standard deviation of the two-dimensional Gaussian blur function measure on the image plane at a known defocus setting, and So is the standard deviation of the two-dimensional Gaussian point spread function of the optical system for the best focus setting for an appropriate test pattern target. The local blur is estimated based on a paper by Chiang and Boult titled "Local Blur Estimation and Super-Resolution," incorporated by reference. A script based on the imaging-consistent reconstruction algorithm QRR solves the one-dimensional case for the situation when the edge types approximate step edges. QRR is a cubic polynomial that spans from the center of one original image pixel to the center of the next original image pixel along either a row or column where $0 \leq x \leq 1$.

According to a simple embodiment of the present invention, multiple range estimates derived from the above equations and the mean of those estimates are used as the range to the target. In a more refined embodiment of the present invention, in order to provide a capability out to a distance of about twelve kilometers, two images are collected of an aerial target with different camera/optics parameter settings in order to obtain two blurred images (an image pair) for comparison purposes. Enhanced performance is obtained by capturing the image pairs simultaneously or with a very short time period between capturing each image of the image pair. These two images are then compared in a process that determines the additional blur due to atmospheric effects in order to effectively remove the atmospheric effects in order to provide a means to accurately determine the range to the target. According to the preferred configuration, the component of blur added to each small image patch from atmospheric effects is determined prior to determining the range to any airborne objects within those patches of the images unless the air is perfectly still (which would not normally be an assumption that could be made when the aerial vehicle 21 is deployed on an operational mission). Note, according to various embodiments of the present invention, a difference of blur circle radius of $1/20^{th}$ of a pixel can be reliability determined according the preferred configuration.

Using the configuration shown in FIGS. 7 and 8, in operation, the wide field of view portion of the optical system 23 would extract, for example, sixty image frames per second (thirty image pairs per second) with a much shorter time between paired images or image frames (taken at different focus settings—e.g., two different focal plane array positions) than the time between the separate image pairs. As noted above, the time between each image of an image pair should be as short as practical and still gather enough light to produce the desired image. The level of current ambient lighting conditions can be analyzed to determine the amount of time necessary to gather sufficient light between image frames. A control signal can be provided to the piezoelectric stepper control motor assembly 55' (which moves the WFOV focal plane array 51') through the position controller 93 to cause the stepper motor assembly 55' to cycle between two known positions along the optical axis of the focal plane array 51'.

Information about targets detected in the wide field of view is provided to the sensor control and image processor 91 (central controller) to allow the processor 91 or downstream mission computer 92 (see FIG. 1) to estimate or otherwise determine where the optical system 23 should "look" with its narrow field of view portion of the system 23. The narrow field of view would "look," for example, in one hundred positions per second within the wide field of view responsive to application of a control signal to the scan assembly 61 through the scan mirrors controller 97 and take a pair of images at each of those positions. As with the wide field of view portion, time between each image of an image pair should be as short as practical and still gather enough light to produce the desired image. Therefore, the narrow field of view portion of the system 23 would typically collect up to two hundred frames per second (one hundred image pairs per second). Note, in a configuration having only a narrow field of view capability, such as, for example, that shown in FIG. 4, the scan mirrors assembly 61 would be controlled to acquire the aerial targets according to a preselected scan pattern.

According to the above described scenario, if there are only ten aerial targets within the wide field of view, the optical system 23 could look at each of them and extract ten image pairs each per second or twenty frames for each areal target. According to the preferred configuration, however, depending upon the target characteristics and whether or not the optical system 23 is configured with tracking software (described later), a priority scheme can be implemented to determine how often each target actually gets looked at. For example, the aerial target deemed to have the highest priority (e.g., the fastest, the closest, and/or the one most likely on a collision course, etc.) can be "looked at" a disproportionate number of times at the expense of those deemed to have a lesser priority. That is, in a typical application, the first or second WFOV "look" provides the azimuth, elevation, and a rough estimate of range of each of the aerial targets within the wide field of view; the first NFOV "look" is directed to highest priority target; the second NFOV look begins to provide direction and velocity data; and the third or fourth NFOV look is a result of track filtering—i.e., the processor 91 pans the scan mirrors 63, 65, to an anticipated location of target, rather than a detected position of the target or a generic anticipated location.

According to a preferred configuration, potential target reports (locations) can be fed into a tracking system which performs track filtering based, for example, on Kalman filtering algorithms. Target heading, velocity, and accelerations are estimated, for example, by the Kalman filter process, which nearly optimally combines the information to reduce the effects of random noise sources. False targets may appear like random noise to the filtering process and are usually removed from consideration because they don't pass certain user defined requirements. For example, real targets usually have a close to steady velocity and a nearly constant apparent heading. False targets may have few repeated reports in the same volume of space, widely varying velocity, and/or random heading. Threshold values/adjustable design parameters can be used to reject or gate false targets from that which passes as true targets.

Figure 10:
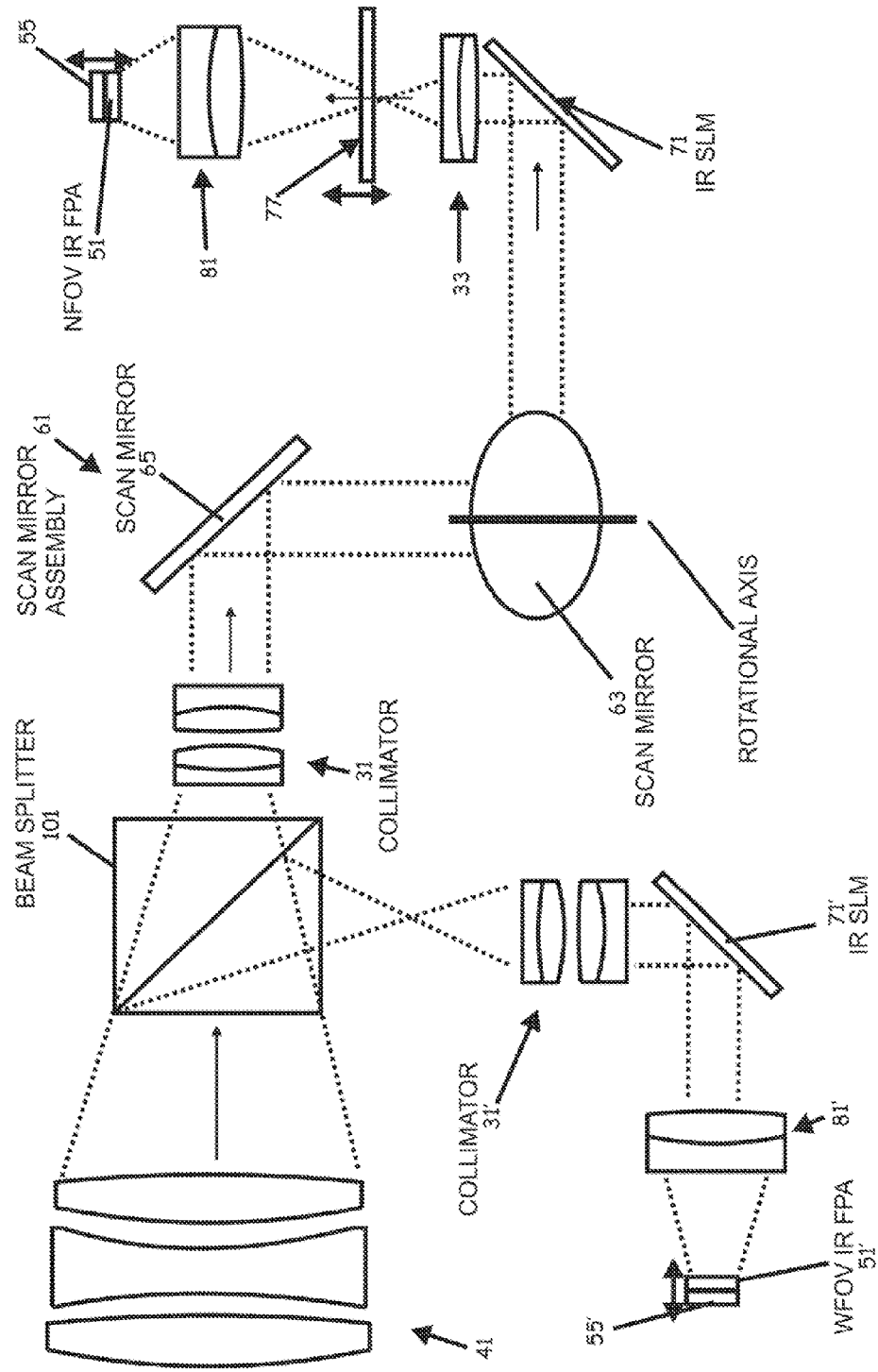
FIG. 10 is a schematic diagram of an optical system for passively sensing and avoiding aerial targets having a common aperture dual field of view optical detection and ranging infrared sensor with steerable narrow field of view and adaptive background control according to an embodiment of the present invention.

FIG. 10 illustrates the optical system 23 similar to that of FIG. 7 with the inclusion of the IR blocking spatial light modulator 77, described above, and a second collimator 31'. In this configuration, the beam splitter 101 is optionally positioned between the objective lens assembly 41 and the respective collimators 31, 31', rather than downstream of collimator 31 to enhance modularity/line replacement capability, but at the expense of the requirement of an additional collimator 31'. An achromatic doublet 81' is positioned in the wide field of view pathway between the spatial light modulator 71' in the focal plane array 51' to transmit light to the focal plane array 51'.

Figure 11:
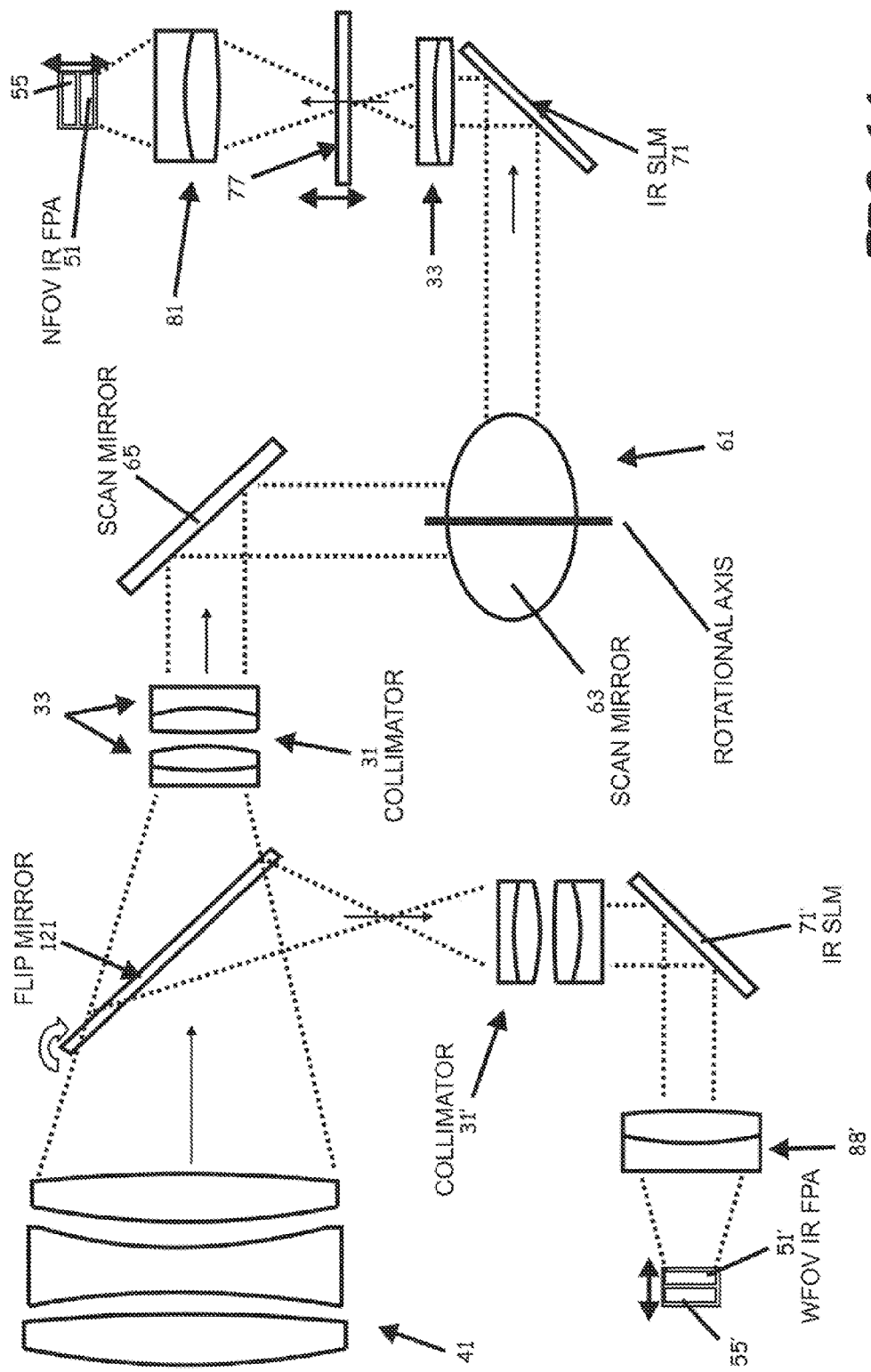
FIG. 11 is a schematic diagram of an optical system for passively sensing and avoiding aerial targets having a common aperture dual field of view optical detection and ranging infrared sensor with steerable narrow field of view and adaptive background control according to an embodiment of the present invention.

FIG. 11 illustrates the optical system 23 similar to that of FIG. 10, but employing a flip mirror 121 in place of the beam splitter 101. The flip mirror 121 allows light received through the objective lens assembly 41 to alternatively be directed either to the wide field of view portion of the optical system 23 or in the narrow field of view portion of the optical system 23. One significant disadvantage of use of the beam splitter 101 is that, generally, the amount of light being sent down the separate wide field of view and narrow field of view pathways is substantially reduced (e.g., typically divided in half). One significant advantage, however, is that the focal plane arrays 51, 51', are provided continuous acquisition of light received through the objective lens assembly 41. Similarly, but oppositely, one significant advantage of the flip mirror 121 is that there is little to no substantial reduction in light intensity. One major disadvantage, however, is the reduction in the amount of access to the light received through the objective lens assembly 41 individually provided to the focal plane arrays 51, 51'. In situations where the reduction in light intensity caused by beam splitter 101 outweighs the reduction in available access time, the flip mirror 121 can be used in place of the beam splitter 101.

Figure 12:
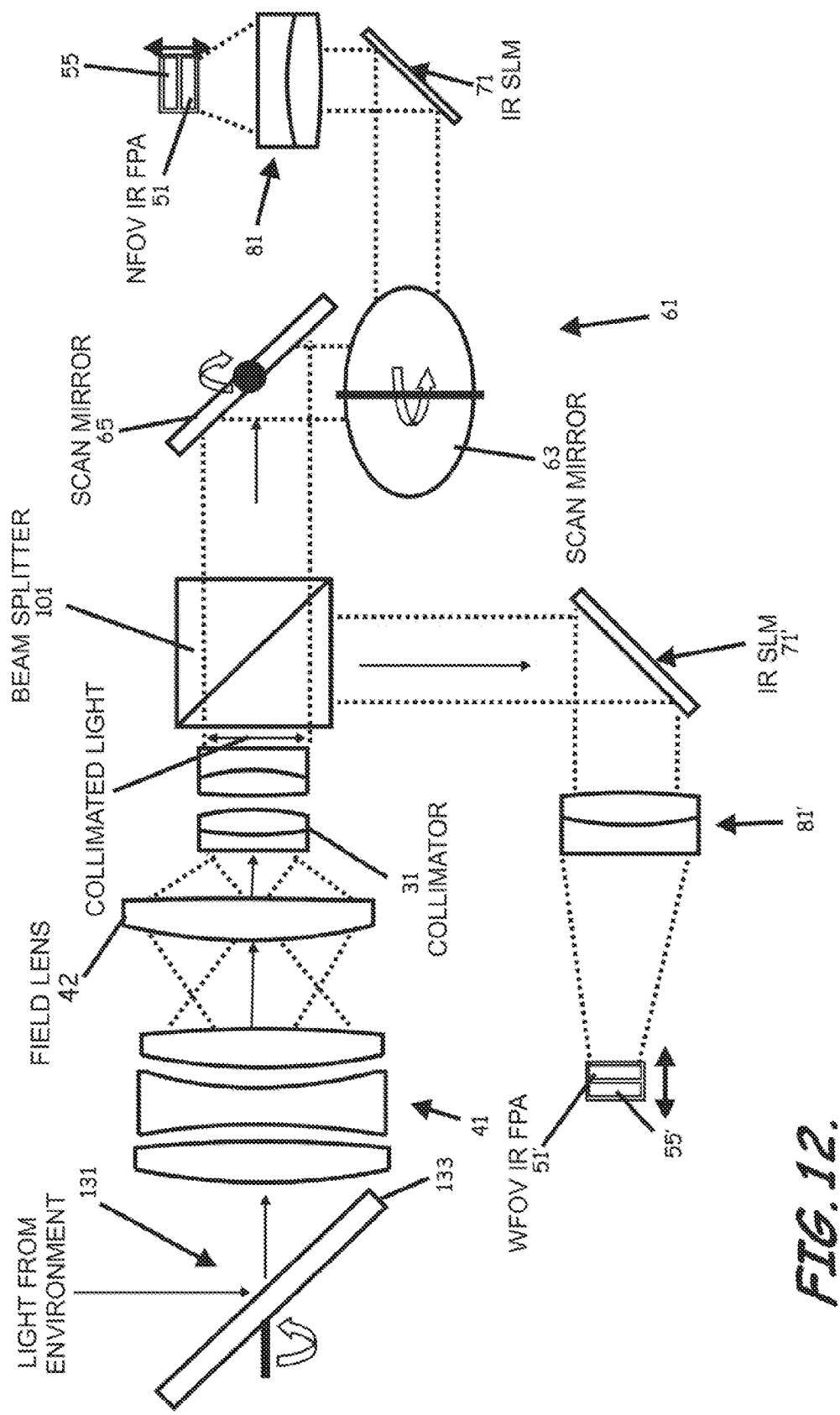
FIG. 12 is a schematic diagram of an optical system for passively sensing and avoiding aerial targets having a common aperture dual field of view optical detection and ranging infrared sensor with steerable wide and narrow fields of view according to an embodiment of the present invention.

FIG. 12 illustrates an example of an embodiment of the optical system 23 similar to that shown in FIG. 7, but with a second scan mirror assembly 131 including a scan mirror 133 configured to pan the entire wide field of regard 29 of ±110 degrees azimuth to allow employment of a single optical system 23 rather than the, e.g., five separate optical systems 23, but with the expense of a reduction in the amount of time available to "look" at the individual sections of the aerial environment.

Figure 13:
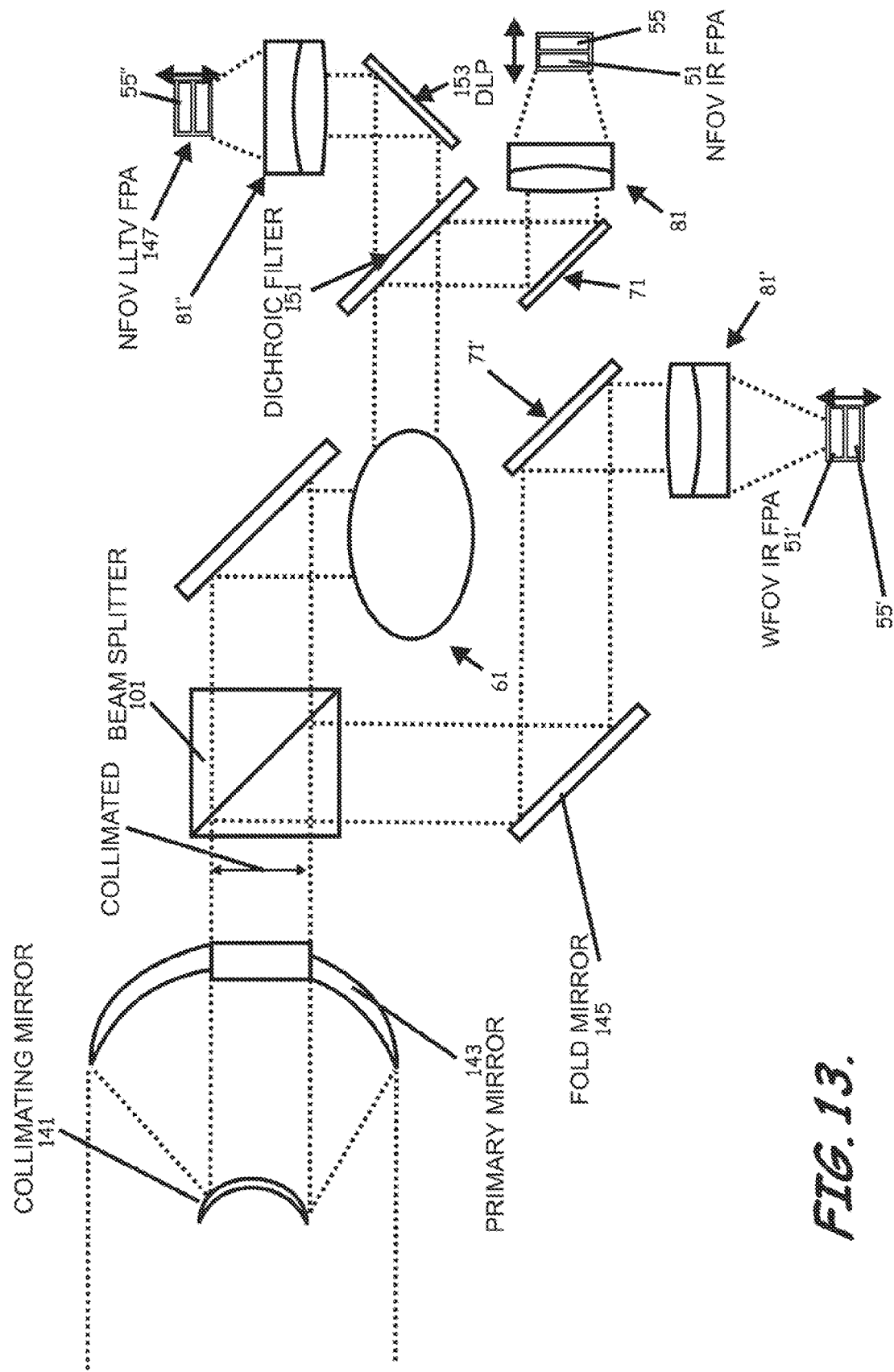
FIG. 13 is a schematic diagram of an optical system for passively sensing and avoiding aerial targets having a common aperture dual field of view optical detection and ranging sensor with steerable narrow field of view and dual narrow band detectors according to an embodiment of the present invention.

FIG. 13 illustrates an example of an embodiment of the optical system 23 similar to that shown in FIG. 7, but with modifications to the portion of the optical system 23 converting the received light to collimated light, and with modifications to the narrow field of view portion of the optical system to provide the benefits of both visible and infrared imaging to the narrow field of view portion of the system 23. For example, the collimator 31 and the objective lens assembly 41 are replaced with a collimating mirror 141 and a primary mirror 143 to provide collimated light to the beam splitter 101. Additionally, a fold mirror 145 has been added to the wide field of view portion of the optical system 23 to enhance compactness. Further, the light emanating from the scan mirror assembly 61 according to the selected narrow field of view is divided to provide light to the previously described narrow field of view infrared focal plane array imaging device 51 and a narrow field of view visible light capable imaging device such as, for example, a low light television 147 movable along its optical axis, for example, using piezoelectric stepper motor assembly 55" or other functionally similar device. Also, a dichroic filter 151 is positioned in the optical pathway between the scan mirror assembly 61 and the low light television 147 to reflect the infrared portion of the light to the narrow field of view infrared focal plane array 51 and to allow light in the visible spectrum to pass to the low light television 147 via a digital light processor 153. An achromatic doublet 81" is positioned to transmit light to the low light television 147.

Similar to the function of the infrared spatial light modulator 71, the digital light processor 153 is positioned to adjust relative aperture size of light received from the scan mirror assembly 61 to rapidly optimize blur differential between images and/or airborne objects within an image to enhance determining atmospheric blur and range estimates, and to adjust the amount of light (light intensity) directed to the low light television 147 responsive to environmental lighting conditions of light received from the scan mirror assembly 61 to thereby maintain the light intensity of light directed to the low light television 147 below a maximum intensity level. Note, the low light television 147 can provide enhanced range determination capability and extended ranges in good weather/illumination conditions, whereas the infrared focal plane array 51 provides capabilities well exceeding those of the low light level television 147 for low illumination/bad weather conditions.

Figure 14:
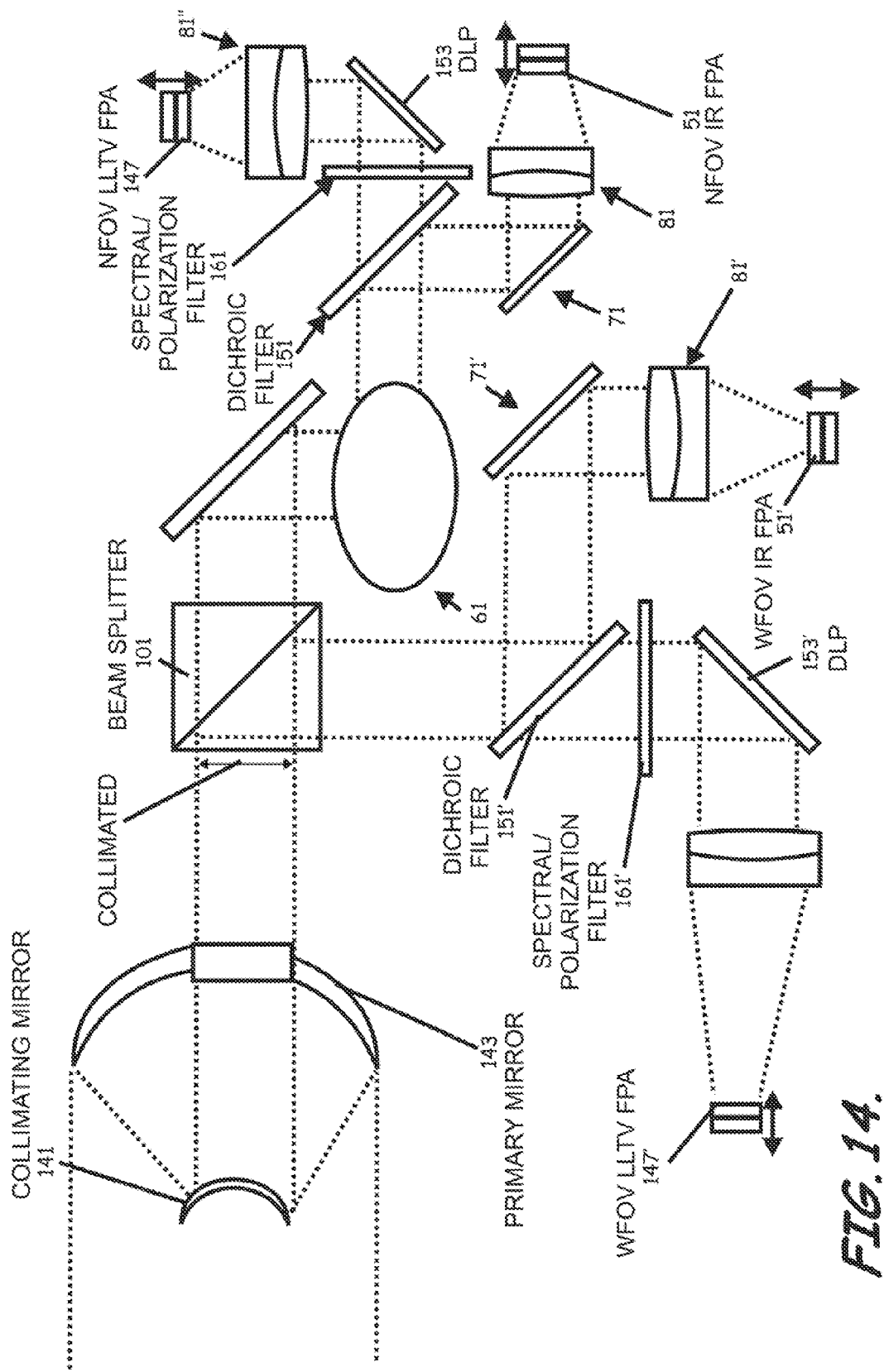
FIG. 14 is a schematic diagram of an optical system for passively sensing and avoiding aerial targets having common mirror objective dual field of view optical detection and ranging sensor with steerable narrow field of view and dual wide and narrow band detectors according to an embodiment of the present invention.

FIG. 14 illustrates an example of an embodiment of the optical system 23 similar to that shown in FIG. 13, but with modifications to the wide field of view portion of the optical system to provide the benefits of both visible and infrared imaging to the wide field of view portion of the system 23, and a spectral filtering capability. For example, the light emanating from the beam splitter 101 to be used by the wide field of view portion of the optical system 23 is divided to provide light to the previously described wide field of view infrared focal plane array imaging device 51' and to a second wide field of view visible light capable imaging device, such as, for example, a low light television 147'. A second dichroic filter 151' is positioned in the optical pathway between the beam splitter 101 and the low light television 147' to reflect the infrared portion of the light to the wide field of view infrared focal plane array 51' and to allow light in the visible spectrum to pass to the low light television 147' via a second digital light processor 153'. Additionally, a first spectral/polarization filter 161 is positioned between the first dichroic filter 151 and the first digital light processor 153, and a second spectral/polarization filter 161' is positioned between the second dichroic filter 151' and the second digital light processor 153' to provide spectral filtering.

Figure 15:
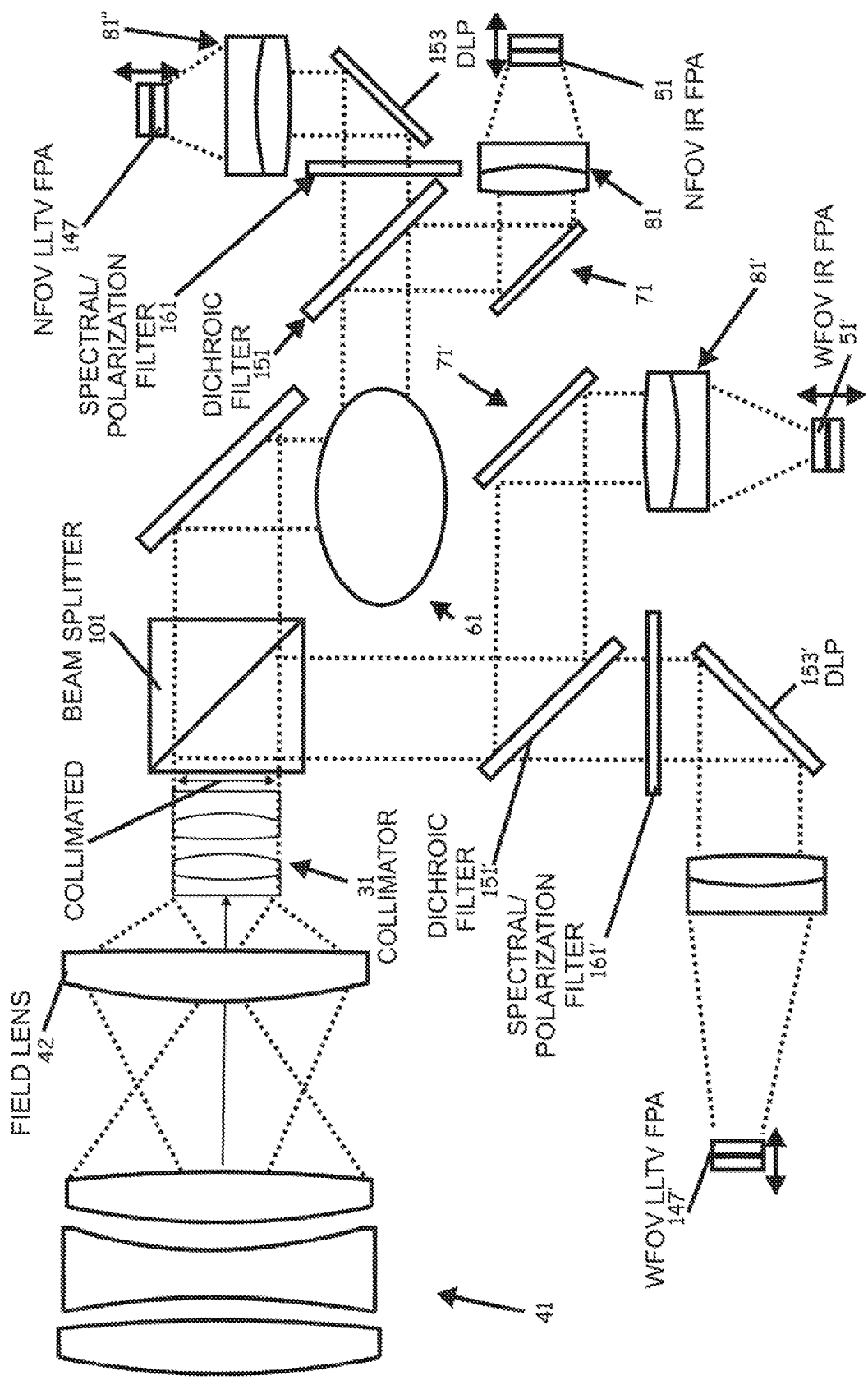
FIG. 15 is a schematic diagram of an optical system for passively sensing and avoiding aerial targets having common objective aperture dual field of view optical detection and ranging sensor with steerable narrow field of view and dual wide and narrow band detectors according to an embodiment of the present invention.

FIG. 15 illustrates an example of an embodiment of the optical system 23 similar to that shown in FIG. 14, but with the light gathering portion of the optical system similar to that of the system shown in FIG. 7—i.e., the collimator 31, field lens 42, and the objective lens assembly 41 shown in FIG. 7 are utilized instead of the collimating mirror 141 and the primary mirror 143 shown in FIG. 14, to provide collimated light to the beam splitter 101. The filter 161, 161' when implemented as a spectral filter can provide high pass, low pass, or band pass filtration, or can function as a notch filter to certain wavelengths of light. When implemented as a polarization filter, the filter 161, 161' blocks or transmits light according to its polarization.

Figure 16:
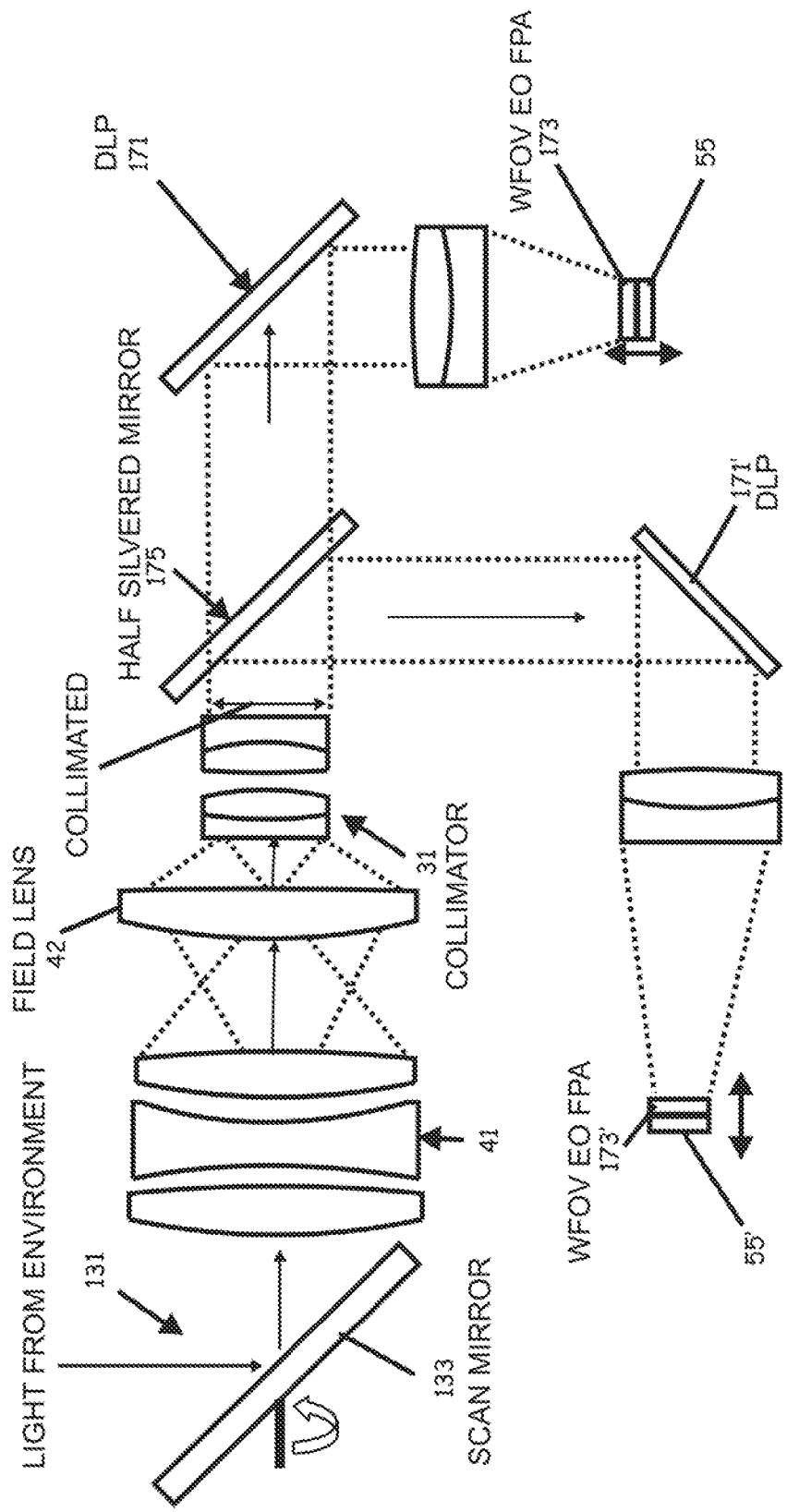
FIG. 16 is a schematic diagram of an optical system for passively sensing and avoiding aerial targets having common aperture dual detector optical detection and ranging electro-optical sensor with steerable dual wide field of view according to an embodiment of the present invention.

FIG. 16 illustrates an example of an embodiment of the optical system 23 configured for simultaneous image processing for a range determination according to a wide field of view, which is particularly suited for applications in high illumination good weather conditions. According to such configuration, no scan mirror assembly is necessary for selecting a narrow field of view from within the wide field of view, as described, for example, with respect to a similar configuration having both narrow and wide field of view portions (see, e.g., FIG. 7). Digital light processors 171, 171' are provided rather than infrared spatial light modulators, and wide field of view electro-optical (EO) imaging devices 173, 173' are provided in place of wide field of view and narrow field of view infrared focal plane arrays. Further, a half silvered mirror 175 is used instead of a beam splitter to simultaneously provide light to both electro-optical imaging devices 173, 173'. A scan mirror assembly 131 including a scan mirror 133 configured to pan the entire wide field of regard 29 of ±110 degrees azimuth is also provided to allow employment of a single optical system 23 rather than, e.g., the five separate optical systems 23 shown in FIG. 1, but with the expense of a substantial reduction in the amount of time available to "look" at the individual sections of the aerial environment. Beneficially, such configuration allows each independent electro-optical imaging device 173, 173' to obtain image data substantially simultaneously to form the image pairs used to determine atmospheric blur, rather than, or in addition to, axial movement of the individual electro-optical imaging devices 173, 173' forming the image pairs. Note, this methodology applies also to systems having redundant narrow field of view portions.

Figure 17:
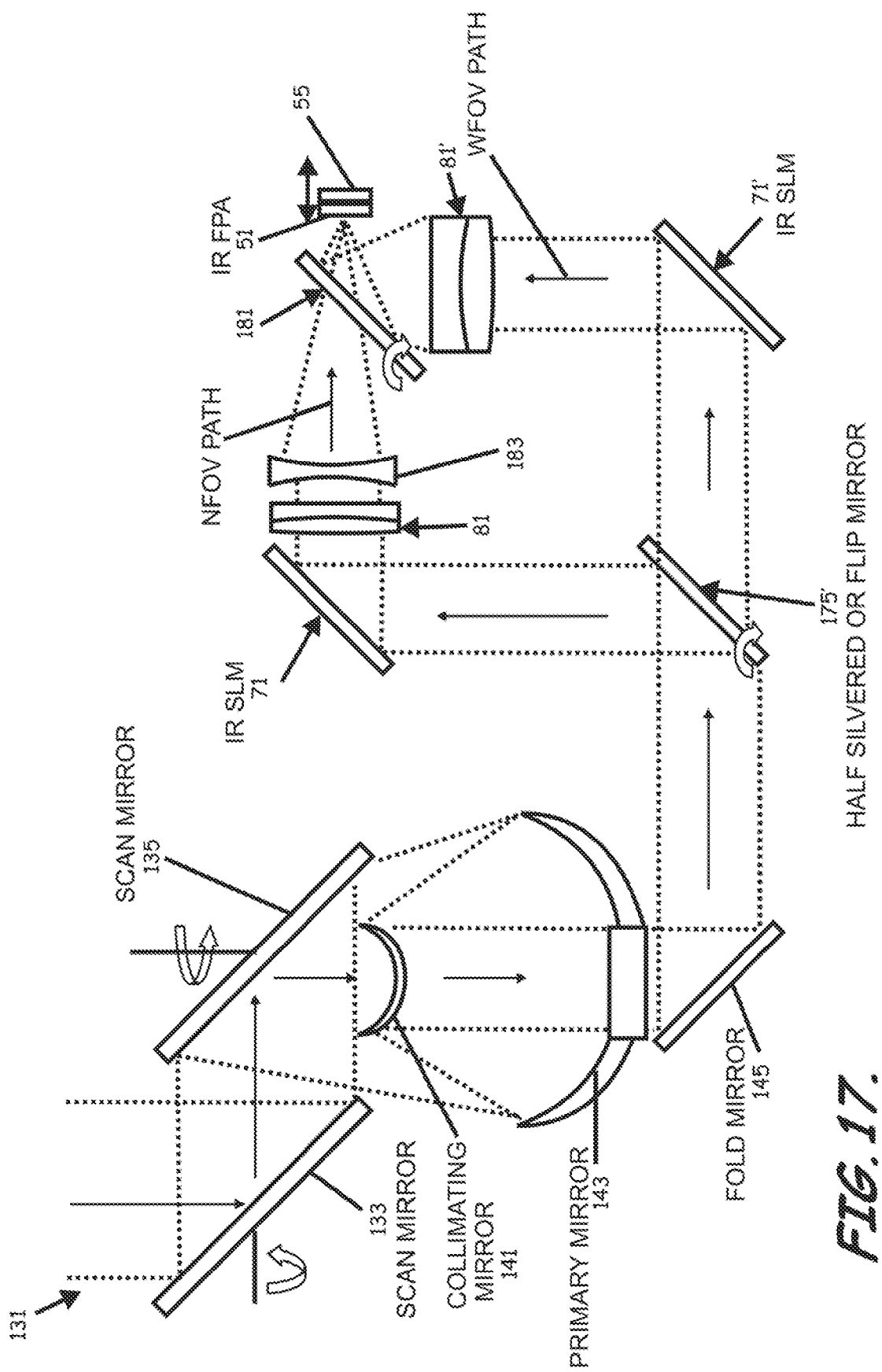
FIG. 17 is a schematic diagram of an optical system for passively sensing and avoiding aerial targets having common aperture dual field of view optical detection and ranging infrared sensor with steerable wide and narrow fields of view and a single wide and narrow band detector according to an embodiment of the present invention.

FIG. 17 illustrates an example of an embodiment of the optical system 23 configured to provide both wide field of view and narrow field of view-based image data using a single imaging device, such as, for example, infrared focal plane array 51. The optical system 23 includes a scanning mirror assembly 131 having first and second scan mirrors 133, 135, which together, allow the system to at least provide a total coverage of ±16.5 degrees in elevation and ±110 degrees azimuth off the nose 25 of the aerial vehicle 21. A collimating mirror 141 and a primary mirror 143 provide collimated light to the focal plane array 51 through two pathways alternatingly selected via a flip mirror 181. In the illustrated configuration, the collimated light emanating from the collimating mirror 141 is folded through a fold mirror 145 and then divided by a half silvered mirror 175' to provide wide field of view and narrow field of view capability. Note, although the half silvered mirror 175' (or other form of beam splitter/divider) is generally used if sufficient illumination exists, a flip mirror similar to flip mirror 181 can alternatively be used if insufficient illumination is anticipated. An achromatic doublet 81 and biconcave lens 183 is positioned in the narrow field of view pathway between the spatial light modulator 71 and the focal plane array 51 to direct light on the focal plane array 51 when the flip mirror 181 is in the "down" position. Similarly, an achromatic doublet 81' is positioned in the narrow field of view pathway between the spatial light modulator 71' in the focal plane array 51 to transmit light to the focal plane array 51 when the flip mirror 181 is in the illustrated "up" position.

Figure 18:
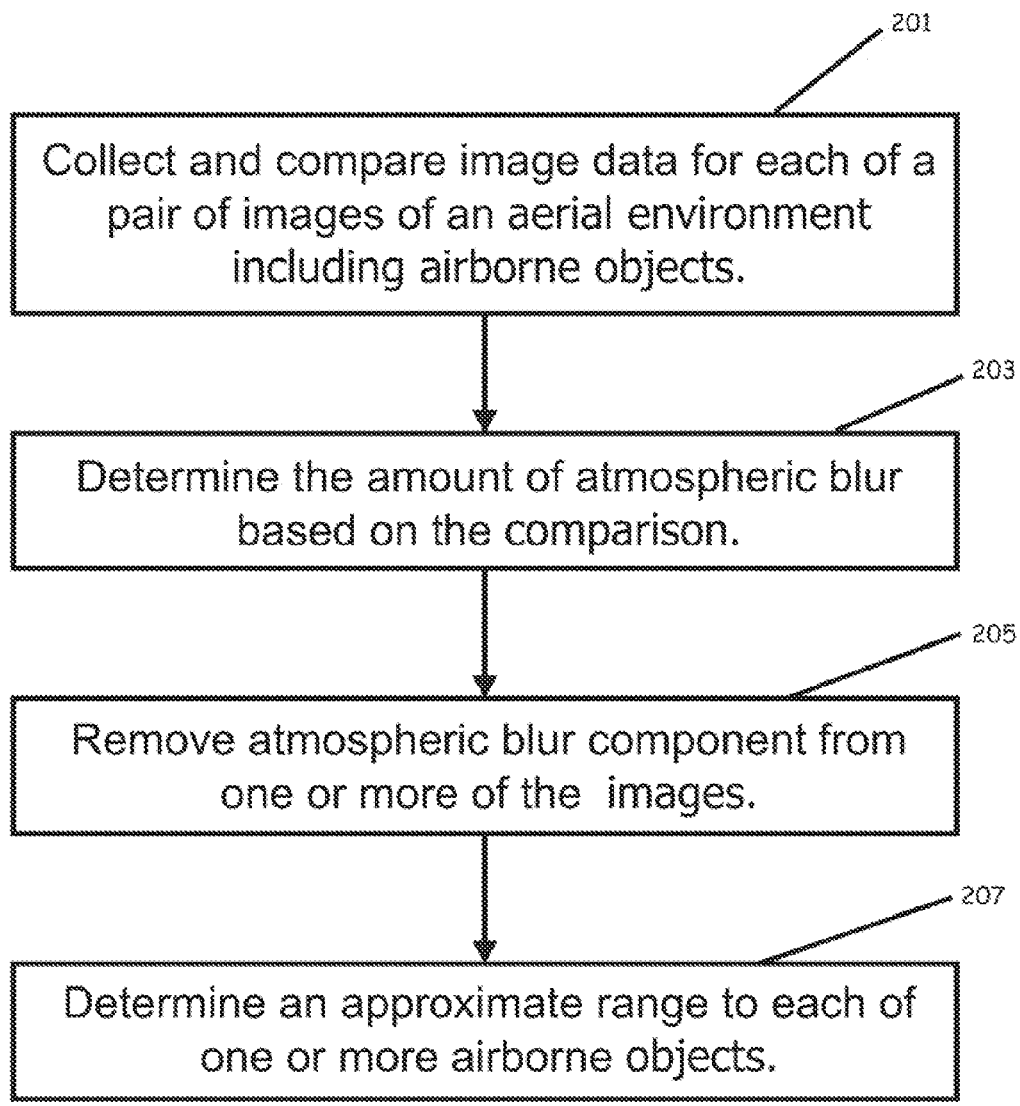
FIG. 18 is a schematic block flow diagram of a method for passively sensing and avoiding aerial targets according to an embodiment of the present invention.

Various embodiments of the present invention also include methods of passively sensing and avoiding aerial targets. FIG. 18, for example, illustrates an example of such a method of passively sensing and avoiding aerial targets. The method can include the steps of collecting image data for each of at least one, but typically a plurality of pairs of images of an aerial environment within a field of regard including one or more airborne objects and comparing the image data of each image of each pair of images to determine an approximate amount of atmospheric blur in the image data (block 201), determining an amount of atmospheric blur in the images responsive to the comparison (block 203), removing the atmospheric blur from image data for at least one of the images in the respective pair of images to form conditioned image data (block 205), and determining an approximate range to each of the one or more airborne objects within the field of view of an optical system 23 responsive to the conditioned image data (block 207).

Figure 19:
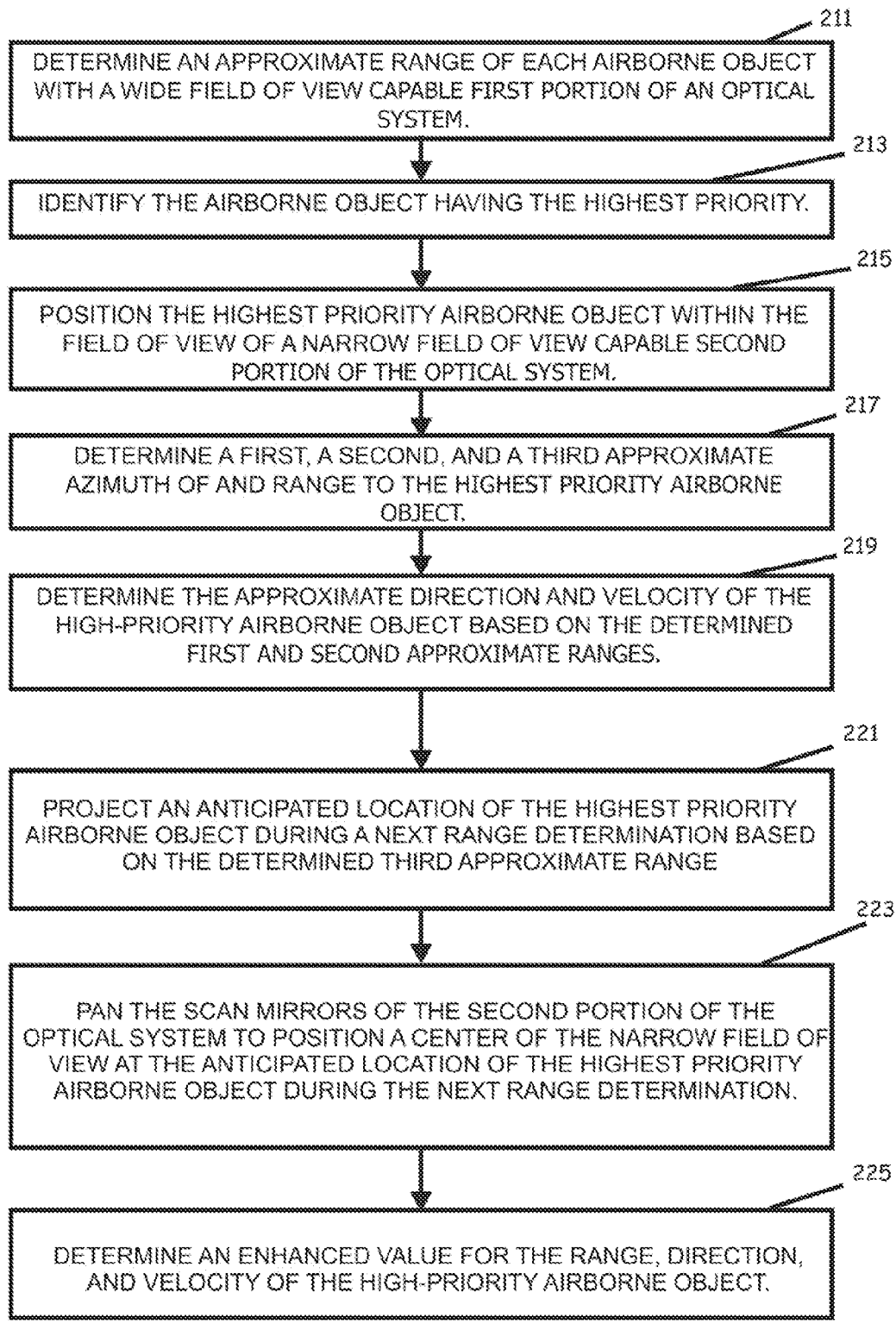
FIG. 19 is a schematic block flow diagram of a method for passively sensing and avoiding aerial targets incorporating track filtering according to an embodiment of the present invention.

As shown in FIG. 19, the method can also include the steps of determining an approximate range of each airborne object with a wide field of view capable first portion of the optical system 23 (block 211), identifying the airborne object having the highest priority (block 213), positioning the highest priority airborne object within the field of view of a narrow field of view capable second portion of the optical system 23 (block 215), determining a first, a second, and a third approximate azimuth and elevation of, and range to, the highest priority airborne object (block 217), and determining the approximate direction and velocity of the high-priority airborne object based on the determined first and second approximate ranges (block 219). The method can also include the steps of projecting or otherwise determining an anticipated location of the highest priority airborne object during a next range determination based on the determined third approximate range (block 221), panning the scan mirrors of the second portion of the optical system 23 to substantially position a center of the narrow field of view at approximately the anticipated location of the highest priority airborne object during the next range determination based on the anticipated location of the highest priority airborne object extracted from the current range determination (block 223), and determining an enhanced value for the range, direction, and velocity of the high-priority airborne object based on the enhanced positioning of the narrow field of view (block 225).

Figure 20:
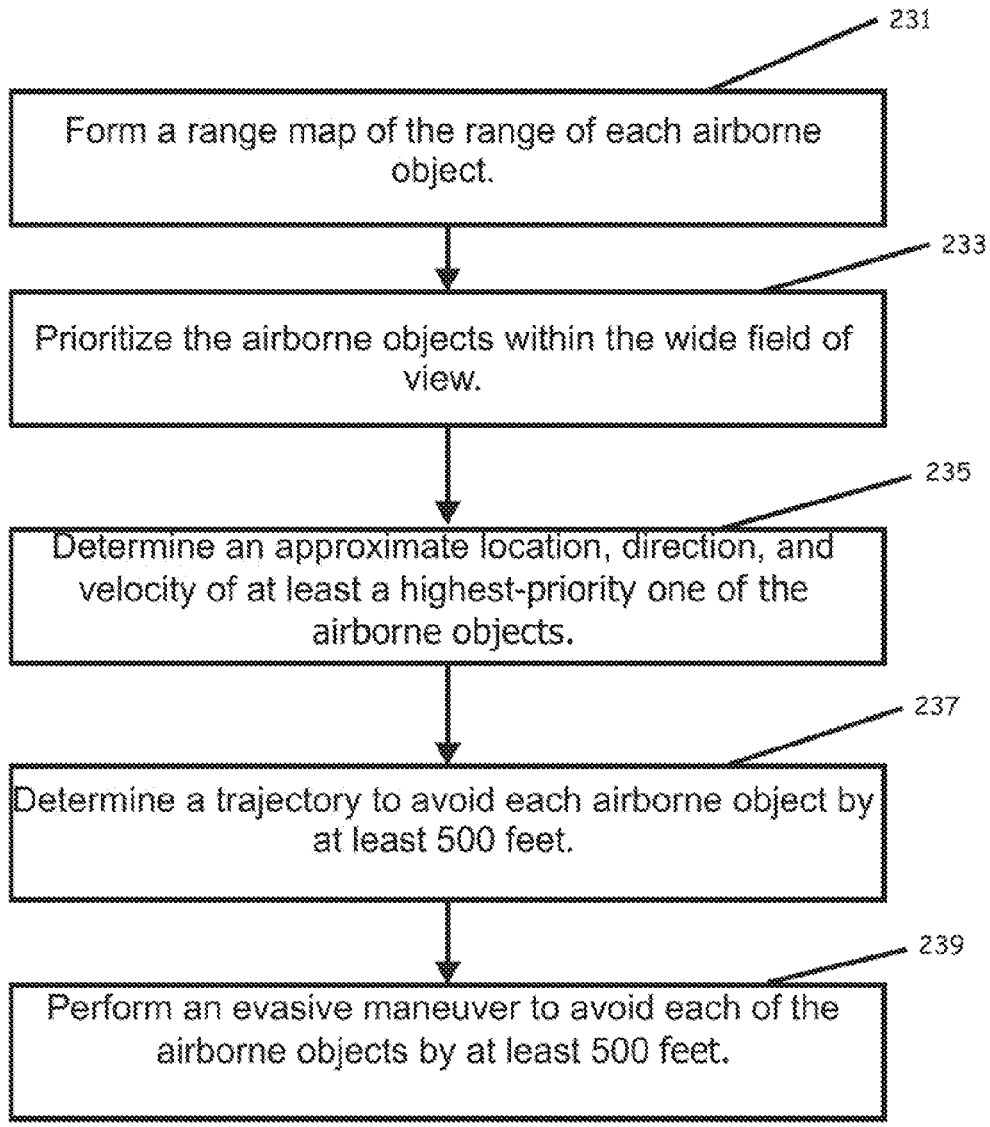
FIG. 20 is a schematic block flow diagram of a method for passively sensing and avoiding aerial targets incorporating evasive maneuvering according to an embodiment of the present invention.
Figure 21:
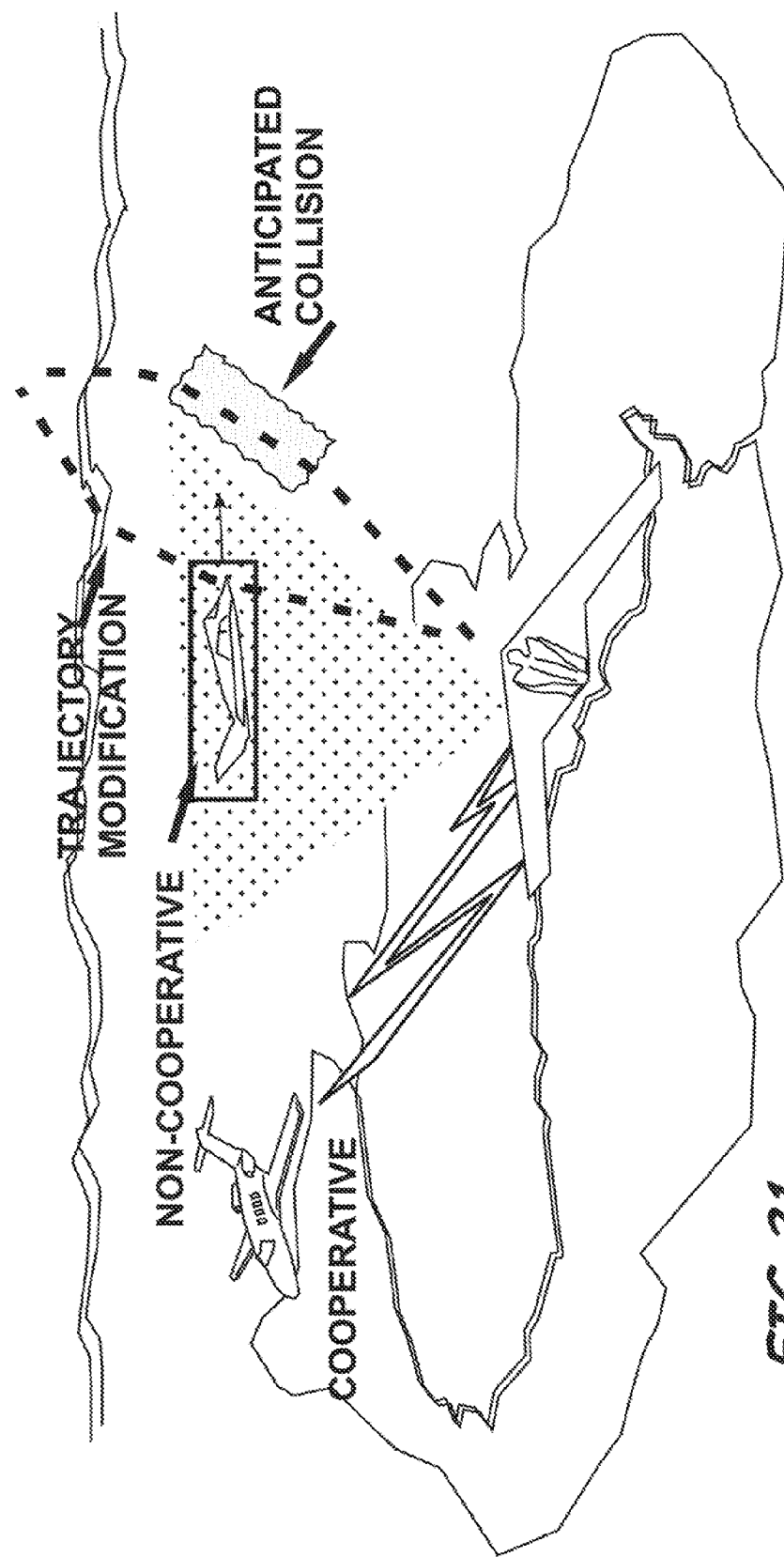
FIG. 21 is an environmental illustration of a portion of a method for passively sensing and avoiding aerial targets according to an embodiment of the present invention.
Figure 22:
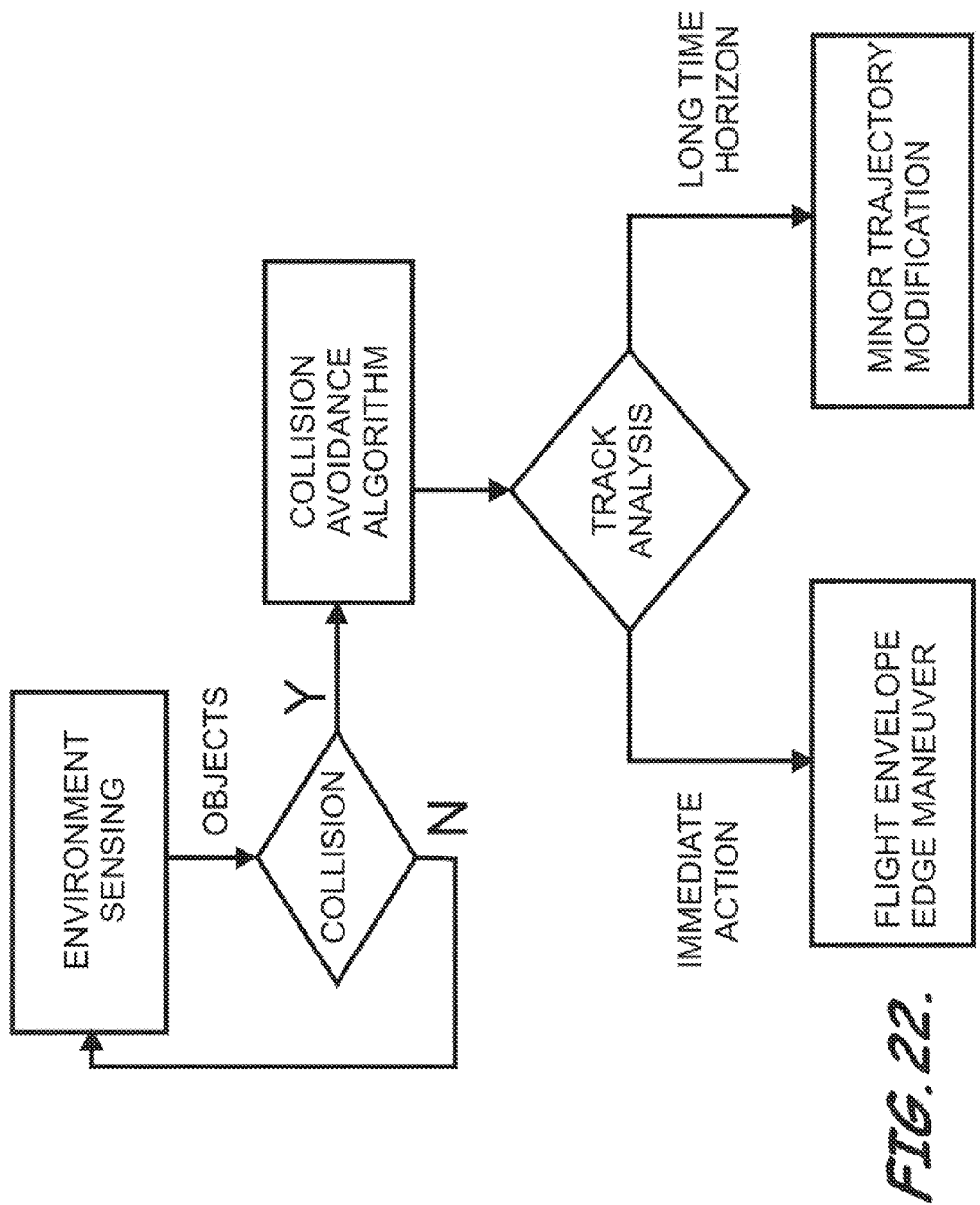
FIG. 22 is a schematic block flow diagram illustrating a decision tree to determine evasive maneuver selection according to an embodiment of the present invention.

As shown in FIGS. 20 and 21, the method can also, or alternatively, include the steps of forming a range map of the range of each separate one of the airborne objects using conditioned image data derived from two or three pairs of images of the environment within the field of view of the optical system 23 (block 231), prioritizing the airborne objects within the wide field of view responsive to the respective determined approximate range, and later, responsive to a determined velocity or trajectory (block 233), determining an approximate location, direction, and velocity of at least the highest-priority one of the airborne objects (block 235), determining a trajectory to avoid each airborne object by at least 500 feet (block 237), and performing an evasive maneuver to avoid each of the airborne objects by at least 500 feet (block 239). Note, FIG. 22 illustrates a decision tree to determine whether the evasive maneuver identified in block 239 should be a flight envelope maneuver or a minor trajectory modification based upon a track analysis of a non-cooperative aerial object.

Figure 23:
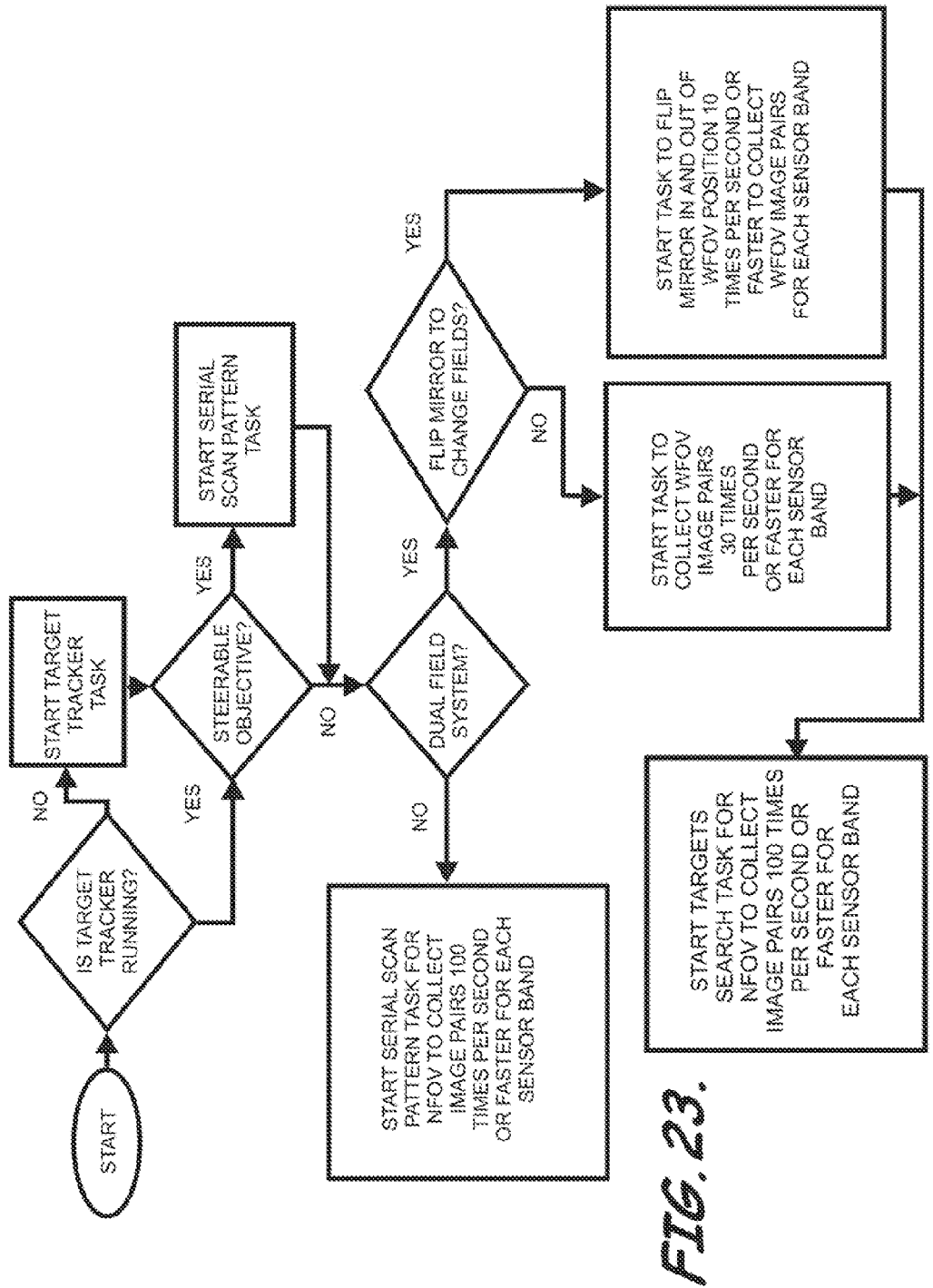
FIG. 23 is a schematic block flow diagram illustrating a startup flowchart for a generic optical system according to an embodiment of the present invention.
Figure 24:
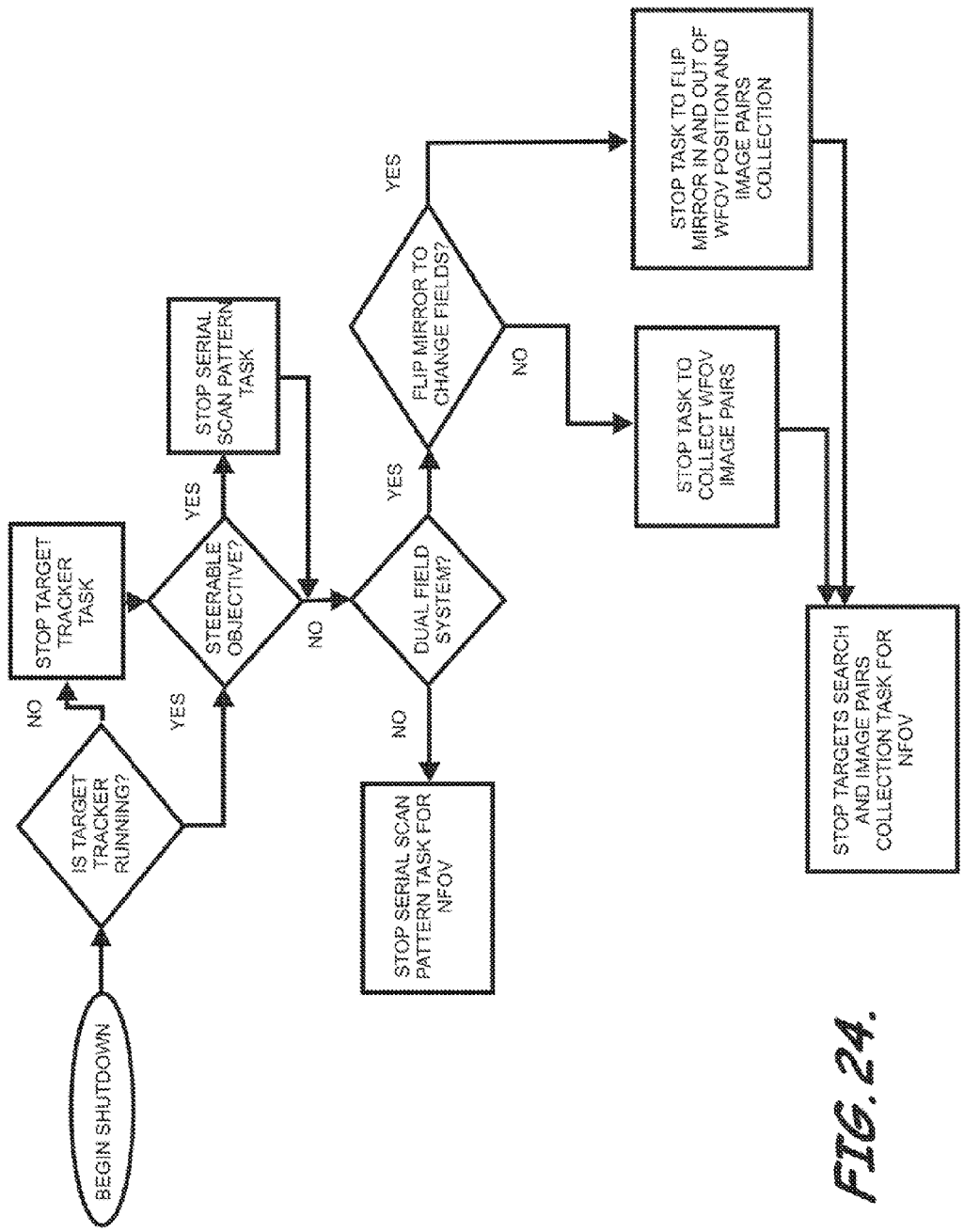
FIG. 24 is a schematic block flow diagram illustrating a shutdown flowchart for a generic optical system according to an embodiment of the present invention.
Figure 25:
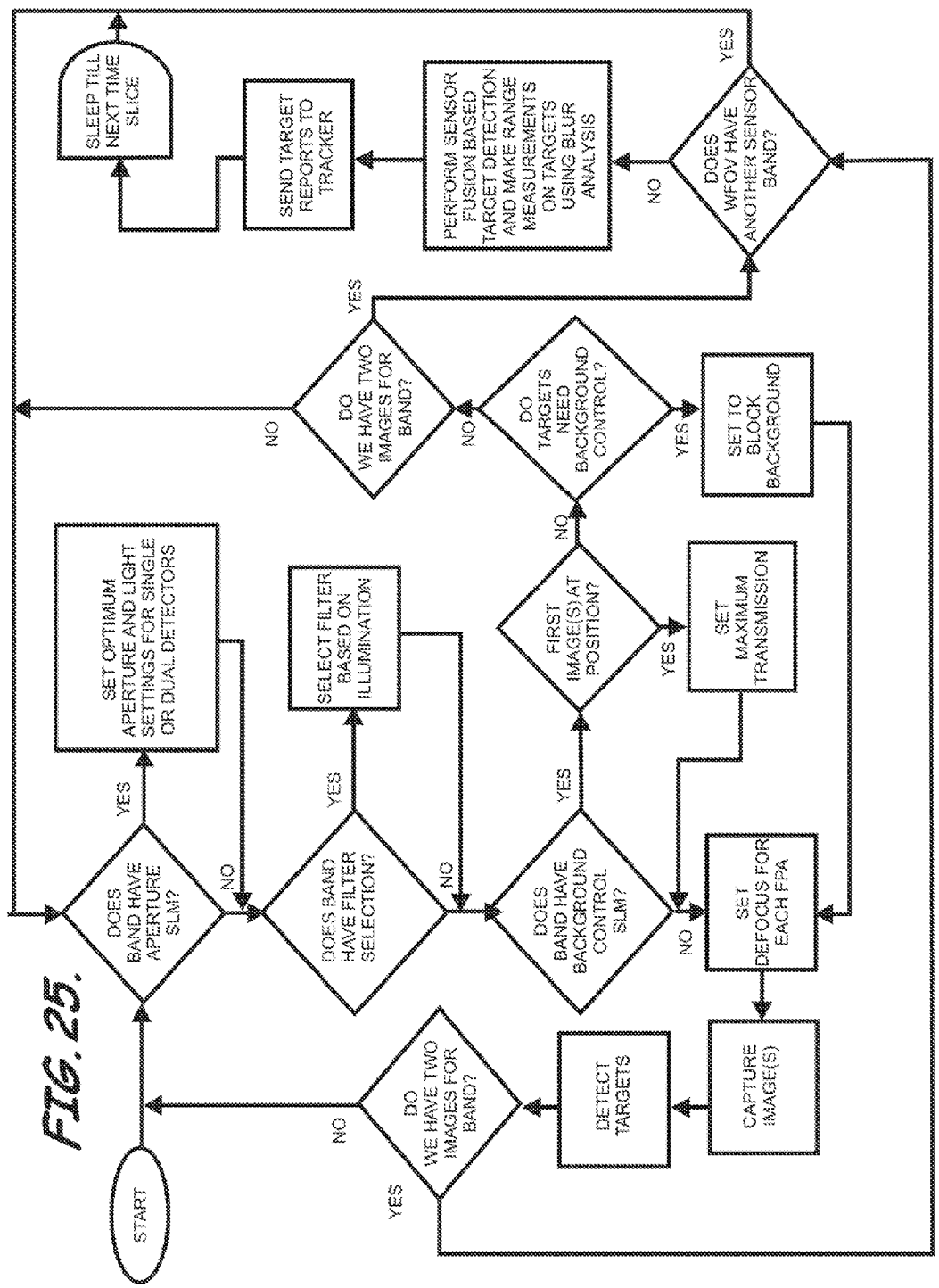
FIG. 25 is a schematic block flow diagram illustrating a generic flowchart of decision blocks to collect wide field of view image pairs for systems with a beam splitter according to an embodiment of the present invention.
Figure 26:
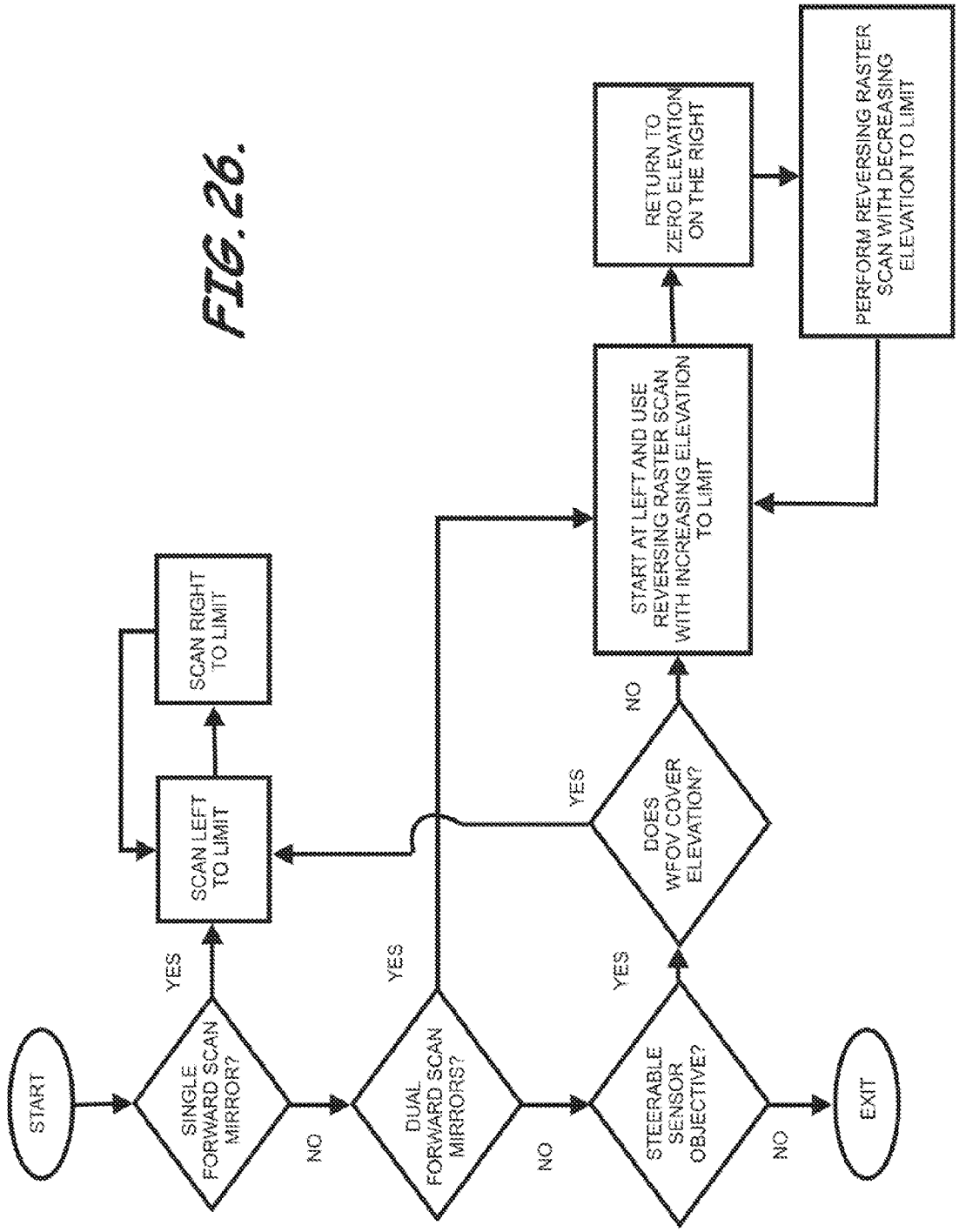
FIG. 26 is a schematic block flow diagram illustrating a generic flowchart of decision blocks to perform a serial scan pattern task for systems having steerable objective or forward scan mirrors according to an embodiment of the present invention.

FIGS. 23 and 24 illustrate startup and shut down flowcharts for a generic optical system 23 according to an embodiment of the present invention. FIG. 25 illustrates an exemplary generic flowchart illustrating decision blocks to collect wide field of view image pairs for systems with a beam splitter. FIG. 26 illustrates an exemplary generic flowchart illustrating decision blocks to perform a serial scan pattern task for systems having steerable objective or forward scan mirrors.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions described previously with respect to the program product 94 stored in the memory of the sensor control and image processor 91, and the processor executable portions of the method steps according to the various embodiments of a method of passively sensing and avoiding aerial targets, described above.

Various embodiments of the present invention have several advantages. For example, an embodiment of the present invention provides a sensor fused passive ranging sensor system with common optics duel band sensors for sense-and-avoid applications for unmanned aircraft systems, which can provide the required coverage detailed in the ASTM F2411-07 Standard Specification. Where current attempts at passive ranging with EO or IR sensors onboard UASs have involved performing maneuvers by the UAS in order to speed convergence of tracking algorithms which are utilizing angle-angle only data, and which tend to suffer from high false alarm rates and long convergence times for tracking, various embodiments of the present invention passively determine range from EO or IR sensors without requiring the UAS to maneuver to help estimate range to target and speed convergence times for tracking, and can reduce false alarm rates substantially. Passive operation can be extremely beneficial for non-cooperative operations without active emissions for low observability of the using platform. Advantageously, various embodiments of the present invention can also be used for advanced missile warning systems on aircraft or ground vehicles, automated airborne refueling sensor system, and for advanced target detection and tracking systems on aircraft or ground vehicles.

Various embodiments of the present invention make use of the DFD method to determine range to airborne targets in an image, and only require processing a few images. Advantageously, according to an embodiment of the present invention a complete range map can be made from two or three images using DFD. A spatial light modulator (SLM) may be used which is appropriate to the sensor band to further improve target ranging accuracy using the DFD method. According to various duel field of view configurations, a wide field of view can be processed initially, approximately 30 degrees vertically and 44 degrees horizontally for the field of view (FOV) for each of, e.g., five sensors. The five sensors of this type can cover the full detection requirements of ±15 degrees elevation and ±110 degrees azimuth without having to move the sensors relative to the aircraft. This processing can be followed by narrow field of view operation with the common optics by using two scanning mirrors. The narrow field of view can improve range estimates accuracy and give confirmation of actual targets, while eliminating false alarms that were detected in the wide field of view operations. The use of low light television LLTV detectors and near wave or mid wave or long wave IR detectors together can substantially increase detection rates, improve detection capabilities under adverse weather conditions, further reducing false alarms rates, and can increase system reliability and accuracy. Dual detector imaging and multi-FOV operations can take place simultaneously or can be interleaved, depending upon the system configuration selected.

Advantageously, for the applications of advanced missile warning systems on aircraft or ground vehicles, for advanced target detection and tracking systems on aircraft or ground vehicles, and for additional applications, various embodiments of the present invention can be used to search large areas of sky or space around a vehicle for long range target detection and tracking with very high combined scan rates due to the use of multiple sensors operating with wide and narrow fields of view without the use of gimbals. Typical missile warning systems currently operate in only wide field of view mode with a single sensor type and no, or very limited, capability to perform ranging functions. Application to a missile warning system that can also operate in a narrow field of view and perform ranging without moving the sensors could potentially greatly improve the performance over existing systems.

Various embodiments of the present invention exhibit certain advantages over prior systems, such as, for example, avoiding the need to perform maneuvers to speed convergence of trackers, rapidly providing reasonably accurate range data that is suitable for sense and avoid system use, while maintaining fully passive operation for sense and avoid. Various embodiments of the present invention further have lower false alarm rates than existing EO/IR methods being tested, have higher probability of detection of targets at greater ranges, and avoid multiple problems that occur when trying to use stereo optics in a non-cooperative fashion. Because of dual band detectors, such embodiments have greater reliability, better performance under adverse conditions, greater range capability, lower false alarms, and higher detection rates. The accuracy of the range calculations is substantially improved by use of one or more spatial light modulators in embodiments that are so configured. Target recognition rates and target identification rates are also substantially improved, and targets can be tracked with greater reliability and at greater ranges. Larger areas of the sky or space can be covered more rapidly and with greater ranges due to multiple sensors covering separate areas of the field of regard, operating using multiple fields of view simultaneously and/or interleaved operations, when employing embodiments that are so configured.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although primarily described with respect to a low speed unmanned aerial vehicle, various embodiments of the present invention apply equally to higher speed vehicles.

That claimed is:

1. An object detection and avoidance apparatus carried by an unmanned aerial vehicle to provide passive sensing and facilitate avoiding airborne obstacles, the apparatus including at least one optical system comprising:
   a collimator positioned to receive and collimate light waves defining an optical image of an aerial environment within a substantial portion of a field of regard defining a wide field of view and to align the light waves having differing wavelengths entering the collimator to reduce dispersion of separate color components thereof, the aerial environment including, one or more airborne objects;

a plurality of light-sensing elements defining a focal plane array positioned to receive at least a portion of the optical image within the wide field of view to generate image data;

a scan mirror assembly positioned in optical communication with the collimator and in optical communication with the focal plane array to selectively direct light reflected front the one or more airborne objects to the focal plane array according to a narrow field of view, the narrow field of view comprising an image area of less than at least approximately 10 percent of an image area of the wide field of view; and a spatial light modulator comprising a plurality of micro-mirrors, the spatial light modulator positioned in optical communication with the scan mirror assembly and the focal plane array and configured to adjust light intensity of light directed to the focal plane array responsive to environmental lighting conditions of the light received from the scan mirror assembly to thereby maintain the light intensity of the light directed to the focal plane array below a maximum intensity level.

2. The object detection and avoidance apparatus as defined in claim 1, wherein the spatial light modulator comprises an infrared spatial light modulator configured to adjust relative aperture size of light in an infrared spectrum received from the scan mirror assembly to rapidly optimize blur differential between each of a plurality of pairs of images and blur for at least one selected airborne object within each image on the focal plane array to enhance determining atmospheric blur and object range estimates.

3. The object detection and avoidance apparatus as defined in claim 1, wherein the scan mirror assembly includes a first and a second scan mirror to provide airborne object selection according to a narrow field of view from within the wide field of view.

4. The object detection and avoidance apparatus as defined in claim 1, wherein the spatial light modulator is a first spatial light modulator configured for adaptive aperture and light intensity control, and wherein the optical system further comprises:

a second spatial light modulator comprising an array of liquid crystals, the second spatial light modulator positioned in optical communication with the first spatial light modulator and the focal plane array and configured to selectively block light surrounding a target image to thereby substantially eliminate background light transmission to the focal plane array to reduce effective image overlap.

5. The object detection and avoidance apparatus as defined in claim 1, wherein the focal plane array is a first focal plane array positioned to generate image data according to a narrow field of view, wherein the spatial light modulator is a first spatial light modulator, and wherein the optical system further comprises:

a second focal plane array positioned to generate image data according to the wide field of view;

a beam splitter positioned to simultaneously provide the optical image of the aerial environment according to the wide field of view to the scan mirror assembly and to the second focal plane array; and a second spatial light modulator comprising a plurality of micro-mirrors, the second spatial light modulator positioned in optical communication with the beam splitter and the second focal plane array and configured to adjust relative aperture size of light directed to the second focal plane array to rapidly optimize blur differential between each of a plurality of pairs of images and blur for at least one selected airborne object within each image to enhance determining atmospheric blur and object range estimates and to adjust light intensity of light directed to the second focal plane array responsive to environmental lighting conditions of the light received from the beam splitter to thereby maintain the light intensity of the light directed to the second focal plane array below a maximum intensity level.

6. The object detection and avoidance apparatus as defined in claim 1, wherein the focal plane array is a first focal plane array positioned to generate image data according to a narrow field of view, wherein the spatial light modulator is a first spatial light modulator, and wherein the optical system further comprises:

a second focal plane array positioned to generate, image data according to the wide field of view;

a flip mirror positioned optically upstream of the scan mirror assembly to alternatingly provide a substantially unattenuated form of the optical image of the aerial environment according to the wide field of view to the scan mirror assembly and to the second focal plane array to thereby substantially reduce error due to excessive attenuation of the optical image; and a second spatial light modulator comprising a plurality of micro-mirrors, the second spatial light modulator positioned in intermittent optical communication with the flip mirror and in optical communication with the second focal plane array and configured to adjust relative aperture size of light directed to the second focal plane array to rapidly optimize blur differential between each of a plurality at pairs of images and blur for at least one selected airborne object within each image on the second focal plane array to enhance determining atmospheric blur and object range estimates, and to adjust light intensity of light directed to the second focal plane array responsive to environmental lighting conditions of the light received from the flip mirror to thereby maintain the light intensity of the light directed to the second focal plane array below a maximum intensity level.

7. The object detection and avoidance apparatus as defined in claim 1, wherein the scan mirror assembly includes a first and a second scan mirror to provide airborne object selection according to a narrow field of view from within the wide field of view, the object detection and avoidance apparatus further comprising a sensor control and image processor configured;

to provide control signals to the scan mirror assembly to thereby direct the first and the second scan mirrors to pan in combination to provide a selected portion of the image area of the wide field of view according to the narrow field of view to the focal plane array;

to provide control signals to the focal plane array to provide image data generation for a plurality of pairs of images at different sensor plane distances according to the narrow field of view; and to receive the image data generated from the focal plane array to separately determine a range value to each of the one or more airborne objects.

8. The object detection and avoidance apparatus as defined in claim 7, wherein the optical system further comprises:

a focal plane array enclosure containing the focal plane array;

a piezoelectric stepper control motor assembly connected to the focal plane array enclosure;

a focal plane array position controller in communication with the sensor control and image processor and in communication with the piezoelectric stepper control motor assembly to selectively position each separate image within each pair of images at a different offset position to provide a different blurred circle radius between images within each image pair to enhance determining the atmospheric blur and range estimates; and a spatial light modulator controller in communication with the sensor control and image processor and in communication with each separate one of the plurality of micromirrors and configured to individually control each of the plurality of micro-mirrors to adjust the relative aperture size and light distribution of light received from the scan mirror assembly to rapidly optimize blur differential between each of the plurality of pairs of images and blur for at least one selected airborne object within each image on the focal plane array to enhance determining atmospheric blur and object range estimates, and to adjust the light intensity of light directed to the focal plane array.

9. The object detection and avoidance apparatus as defined in claim 7, wherein the first and the second scan mirrors are positioned to pan along separate, spaced apart axes, and wherein the optical system further comprises:

a first scan mirror motivator to provide panning of the first scan mirror along a first pan axis;

a second scan mirror motivator to provide panning of the second scan mirror along a second pan axis;

a scan mirror controller in communication with the sensor control and image processor and in communication with the first and the second scan minor motivators to control panning of the first and the second scan mirrors to thereby provide for the airborne object selection according to a narrow field of view from within the wide field of view.

10. The object detection and avoidance apparatus as defined in claim 1, wherein the optical system is a first optical system;

wherein the field of regard is approximately plus or minus 15 degrees elevation with respect to the lateral axes of the aerial vehicle and approximately plus or minus 110 degrees azimuth with respect to a longitudinal axis of the aerial vehicle; and wherein the object detection and avoiding apparatus further comprises:

a plurality of other optical systems being substantially identical to the first optical system and optically spaced apart from each other and from the first optical system, carried in a forward portion of the aerial vehicle, and collectively configured in combination with the first optical system and with each other to provide object detection throughout the field of regard according to the following standard: an approximately 90 percent or more probability of detection at a minimum distance of approximately 10 kilometers from the aerial vehicle for each airborne obstacle having at least a 22.5 square meters cross-section within the field of regard when the aerial vehicle is airborne.

11. The object detection and avoidance apparatus as defined in claim 1, wherein the scan mirror assembly is a first scan mirror assembly;

wherein the field of regard is approximately plus or minus 15 degrees elevation with respect to the lateral axes of the aerial vehicle and, approximately plus or minus 110 degrees azimuth with respect to a longitudinal axis of the aerial vehicle;

wherein the at least one optical system is a single optical system providing object detection throughout the extent of the field of regard; and wherein the single optical system includes a second scan mirror assembly positioned optically upstream of the collimator to scan the extent of the field of regard.

12. The object detection and avoidance apparatus as defined in claim 1, wherein the focal plane array is a first imaging device positioned to generate infrared image data according to the narrow field of view, and wherein the optical system further comprises:

a second imaging device, comprising a low light television positioned to generate visible light image data according to the narrow field of view;

a digital light processor positioned in optical communication with the scan mirror assembly and the first focal plane array and configured to adjust relative aperture size of light received from the scan mirror assembly to rapidly optimize blur differential between each of a plurality of pairs of images and blur for at least one selected airborne object within each image on the first focal plane array to enhance determining atmospheric blur and object range estimates, and to adjust light intensity of light directed to the second imaging device responsive to environmental lighting conditions of light received from the scan mirror assembly to thereby maintain the light intensity of light directed to the second imaging device below a maximum intensity level; and a dichroic filter positioned to reflect infrared light received, from the scan mirror assembly to the spatial light modulator and to pass visible light received from the scan mirror assembly to the digital light processor.

13. The object detection and avoidance apparatus as defined in claim 12, wherein the optical system further comprises one or more of the following:

a spectral filter positioned in optical communication with the scan mirror assembly via the dichroic filter and in optical communication with the second imaging device to provide spectral filtering; and as polarizer positioned in optical communication with the scan mirror assembly via the dichroic filter and in optical communication with the second imaging device to provide polarization filtering.

14. The object detection and avoidance apparatus as defined in claim 1, wherein the collimator comprises a collimating mirror positioned in optical communication with a primary parabolic mirror having a center aperture extending therethrough.

15. An object detection and avoidance apparatus carried by an unmanned aerial vehicle to provide passive sensing and facilitate avoiding airborne obstacles, the apparatus including at least one optical system comprising:

a collimator positioned to receive and collimate light waves defining an optical image of an aerial environment within a substantial portion of a field of regard defining a wide field of view and to align the light waves having differing wavelengths entering the collimator to reduce dispersion of separate color components thereof, the aerial environment including one or more airborne objects;

a first plurality of light-sensing elements defining a first focal plane array positioned to receive at least a portion of the optical image within the wide field of view to generate image data according to a narrow field of view;

a scan mirror assembly positioned in optical communication with the collimator and in optical communication with the focal plane array to selectively direct light reflected from the one or more airborne objects to the focal plane array according to a narrow field of view, the narrow field of view comprising an image area of less than at least approximately 10 percent of an image area of the wide field of view, the scan mirror assembly including a first and a second scan mirror to provide airborne object selection according to a narrow field of view from within the wide field of view;

a first infrared spatial light modulator comprising a plurality of micro-mirrors and positioned in optical communication with the scan mirror assembly and the first focal plane array and configured to adjust relative aperture size of light received from the scan mirror assembly to optimize blur differential between each of a plurality of pairs of images and blur for at least one selected airborne object within each image on the first focal plane array to enhance determining atmospheric blur and object range estimates, and to adjust light intensity of light directed to the first focal plane array responsive to environmental lighting conditions of the light received front the scan mirror assembly to thereby maintain the light intensity of the light directed to the first focal plane array below a maximum intensity level;

a second plurality of light-sensing elements defining a second focal plane array positioned to receive the optical image within the wide field of view to generate image data according to the wide field of view;

a beam splitter positioned to simultaneously provide the optical image of the aerial environment according to the wide field of view to both the scan mirror assembly and to the second focal plane array; and as second infrared spatial light modulator comprising a plurality of micro-mirrors, the second spatial light modulator positioned in optical communication with the beam splitter and the second focal plane array and configured to adjust relative aperture size of light directed to the second focal plane array to optimize blur differential between each of a plurality of pairs of images and blur for at least one selected airborne object within each image on the second focal plane array to enhance determining atmospheric blur and range estimates, and to adjust light intensity of light directed to the second focal plane array responsive to environmental lighting conditions of the light received from the beam splitter to thereby maintain the light intensity of the light directed to the second focal plane array below a maximum intensity level.

16. The object detection and avoidance apparatus as defined in claim 15, further comprising a sensor control and image processor configured:

to provide control signals to the scan mirror assembly to thereby direct the first and the second scan mirrors to pan in combination to provide a selected portion of the image area of the wide field of view according to the narrow field of view to the focal plane array;

to provide control signals to the first focal plane array to provide image data generation for a plurality of pairs of images at different sensor plane distances according to the narrow field of view;

to receive the image data generated from the focal plane array to separately determine a range value to each of the one or more airborne objects;

to provide control signals to the second focal plane array to provide image data generation for a plurality of pairs of images at different sensor plane distances according to the wide field of view; and to receive the image data generated from the focal plane array to separately determine a range value to each of the one or more airborne objects.

17. The object detection and avoidance apparatus as defined in claim 15, wherein the first and the second infrared spatial light modulators are configured for adaptive, aperture and light intensity control, and wherein the optical system further comprises:

a first achromatic doublet positioned between the first spatial light modulator and the first local plane array to correct residual transverse chromatic aberrations therebetween;

a second achromatic doublet positioned between the first spatial light modulator and the first achromatic doublet; and a third spatial light modulator comprising an array of liquid crystals, the third spatial light modulator positioned in optical communication with the first infrared spatial light modulator and the first focal plane array and selectively positionable to selectively block fight surrounding a target image to thereby substantially eliminate background light transmission to the first focal plane array to reduce effective image overlap.

18. The object detection and avoidance apparatus as defined in claim 15, wherein the optical system further comprises:

a third focal plane array comprising the electro-optical device positioned to generate visible light image data according to the narrow field of view;

a digital light processor positioned in optical communication with the scan mirror assembly and the third focal plane array and configured to adjust relative aperture size of light received from the scan mirror assembly to optimize blur differential between each of a plurality of pairs of images and blur for at least one selected airborne object within each image on the third focal plane array to enhance determining atmospheric blur and object range estimates, and to adjust light intensity of light directed to the third focal plane array responsive to environmental lighting, conditions of light received from the scan mirror assembly to thereby maintain the light intensity of light directed to the third focal plane array below a maximum intensity level; and dichroic titter positioned to reflect the infrared portion of the light received from the scan mirror assembly to the first spatial light modulator and to pass the visible portion of the light received front the scan mirror assembly to the digital light processor.

19. The object detection and avoidance apparatus as defined in claim 18, wherein the optical system further comprises one or more of the following:

a spectral filter positioned in optical communication with the scan mirror assembly is the dichroic filter and in optical communication with the third focal plane array to provide spectral filtering; and a polarizer positioned in optical communication with the scan mirror assembly via the dichroic filter and in optical communication with the third focal plane array to provide polarization filtering.

20. A method of passively sensing and avoiding aerial targets, the method comprising the steps of:

collecting image data for each image of a pair of images of a common aerial environment within a field of regard, the aerial environment including one or more airborne objects, each image of the pair of images including a component of atmospheric blur associated with the aerial environment, the image data for each of the pair of images separately collected using at least one different optical parameter setting for a passive mono-optical system having a field of view;

comparing the image data for one of the pair of images to the image data of the other of the pair of images to determine an approximate amount of atmospheric blur in the image data for at least one of the pair of images;

determining the approximate amount of atmospheric blur in the image data for the at least one of the pair of images responsive to the comparison to thereby remove the atmospheric blur from image data for each of the pair of images to define conditioned image data;

comparing resultant blur values for the pair of images responsive to removal of atmospheric blur from the image data for each of the pair of images to thereby determine the approx range of at least one of the one or more airborne objects; and determining an approximate range, to each of the one or more airborne objects within the field of view of the optical system responsive to the conditioned image data.

21. The method as defined in claim 20, wherein the one or more airborne objects is a plurality of airborne objects, and wherein the step of determining an approximate range to each of the one or more airborne objects within the field of view of the optical system includes the steps of:

removing the atmospheric blur from image data for at least one of the pair of images to generate the conditioned image data; and forming a range map of the range of each separate one of the plurality of airborne objects using conditioned image data derived from two or three pairs of images of the environment within the field of view of the optical system.

22. The method as defined in claim 20, wherein the one or more airborne objects are a plurality of airborne objects;

wherein the field of view is a wide field of view;

wherein the method further comprises the step of prioritizing the plurality of airborne objects within the wide field of vie responsive to the respective determined approximate range;

wherein the optical system comprises a first portion configured to determine an approximate range of each of the plurality of airborne objects within the wide field of view of the optical system, and a second portion configured to determine an approximate range of each of the plurality of airborne objects within a narrow field of view of the optical system, the narrow field of view comprising an image area of less than at least approximately 10 percent of an image area of the wide field of view of the optical system; and wherein the step of determining an approximate range to each of the one or more airborne objects within the field of view of the optical system includes the steps of:

determining an approximate range of each of the plurality of airborne objects within the wide field of view of the optical system, determining, one of the plurality of airborne objects located within the wide field of view of the first portion of the optical system to have a highest priority to define a highest priority airborne object, positioning components of the second portion of the optical system so that the highest priority airborne object is within the narrow field of view of the second portion of the optical system, and determining a first, a second, and a third approximate range to the highest priority airborne object.

23. The method as defined in claim 22, further comprising the step of determining the approximate direction and velocity of the high-priority airborne object responsive to the determined first and second approximate ranges.

24. The method as defined in claim 23, wherein the optical system includes a scan mirror assembly comprising a lint and a second scan mirror configured to provide airborne object selection according to the narrow field of view from within the wide field of view, the method further comprising the step of:

projecting an anticipated location of the highest priority airborne object during a next range determination responsive to the determined third approximate range;

panning the first and a second scan mirrors to substantially position a center of the narrow field of view at approximately the anticipated location of the highest priority airborne object during the next range determination responsive to the projecting to enhance determining range, direction, and velocity of the highest priority airborne object; and determining an enhanced value for the range, direction, and velocity of the high-priority airborne object responsive to the panning.

25. The method as defined in claim 20, wherein the one or more airborne objects is a plurality of airborne objects;

wherein the optical system includes a focal plane array and a scan mirror assembly in optical communication with the focal plane array to selectively direct light reflected from the plurality of airborne objects to the focal plane array; and wherein the method farther comprises the step of:

performing a rapid optimization of one or more of the following: blur differential between a pair of images and blur for a selected airborne object within an image on the focal plane array to include the step of adjusting a relative aperture size of light received from the scan mirror assembly to enhance determining atmospheric blur and object range estimates for each of the plurality of airborne objects.

26. The method as defined in claim 20, wherein the one or more airborne objects is a plurality of airborne objects, the method further comprising the steps of:

determining an approximate location, direction, and velocity of at least a highest-priority one of the plurality of airborne objects;

determining a trajectory to avoid each of the plurality of airborne objects by at least 500 feet; and performing an evasive maneuver responsive to the determined trajectory to avoid each of the plurality of airborne objects by at least 500 feet.

* * * * *